(12) United States Patent
Snyder et al.

(10) Patent No.: US 11,162,388 B1
(45) Date of Patent: Nov. 2, 2021

(54) THERMAL MANAGEMENT SYSTEM TO COOL TRANSIENT HEAT LOADS WITH LOW POWER CONSUMPTION

(71) Applicant: Rolls-Royce North American Technologies Inc., Indianapolis, IN (US)

(72) Inventors: Douglas J. Snyder, Carmel, IN (US); Timothy Unton, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/991,611

(22) Filed: Aug. 12, 2020

(51) Int. Cl.
*F01K 3/12* (2006.01)
*F28D 20/02* (2006.01)
*F02C 1/10* (2006.01)

(52) U.S. Cl.
CPC ............... *F01K 3/12* (2013.01); *F02C 1/10* (2013.01); *F28D 20/021* (2013.01)

(58) Field of Classification Search
CPC .......... F01K 17/025; F01K 7/16; F01K 19/10; F02C 7/224; F02C 6/18; F05D 2260/20; F05D 2220/32; F05D 2220/60; F05D 2220/72; F25B 6/00; F25B 40/02; F25B 41/04
See application file for complete search history.

(56) References Cited

U.S. PATENT DOCUMENTS

| | | | |
|---|---|---|---|
| 10,053,222 B2 | 8/2018 | Snyder | |
| 10,081,439 B1* | 9/2018 | Bowman | B64D 37/34 |
| 10,384,792 B2 | 8/2019 | Snyder | |
| 10,746,440 B2 | 8/2020 | Donovan et al. | |
| 10,775,110 B2 | 9/2020 | Snyder et al. | |
| 2008/0006040 A1* | 1/2008 | Peterson | B60H 1/3204 |
| | | | 62/116 |
| 2018/0097266 A1* | 4/2018 | Jalilevand | B60H 1/3205 |
| 2018/0155046 A1 | 6/2018 | Bowman et al. | |
| 2020/0326113 A1 | 10/2020 | Donovan et al. | |

* cited by examiner

*Primary Examiner* — Shafiq Mian
(74) *Attorney, Agent, or Firm* — Crowell & Moring LLP

(57) ABSTRACT

Thermal management systems for cooling high-power, low-duty-cycle thermal loads that include at least three thermally coupled, closed subsystems are provided. Thermal management systems provided herein include a main thermal energy storage loop including a cold-temperature tank and a warm-temperature tank. Thermal management systems provided herein also include a multi-stage compression system or a cascaded architecture of a low-temperature vapor compression system and a high-temperature vapor compression system. Methods of transferring heat from one or more thermal loads to an ambient environment are also provided.

20 Claims, 7 Drawing Sheets

THERMAL MANAGEMENT SYSTEM TO COOL TRANSIENT HEAT LOADS WITH LOW POWER CONSUMPTION

TECHNICAL FIELD

This disclosure relates to thermal management systems, more specifically to a thermal management system for cooling transient heat loads with low power consumption.

BACKGROUND

Conventional methods of rejecting heat from a refrigerant or cooling system, for example, phase change cooling systems, may require sizing the heat rejection component(s), for example, the condenser and fans, for a maximum design heat load at a maximum design rejection temperature. Many thermal management systems include large and heavy components that are intentionally oversized in order to support transient heat loads that operate at low or medium duty cycles, requiring high power. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

Figure 1:
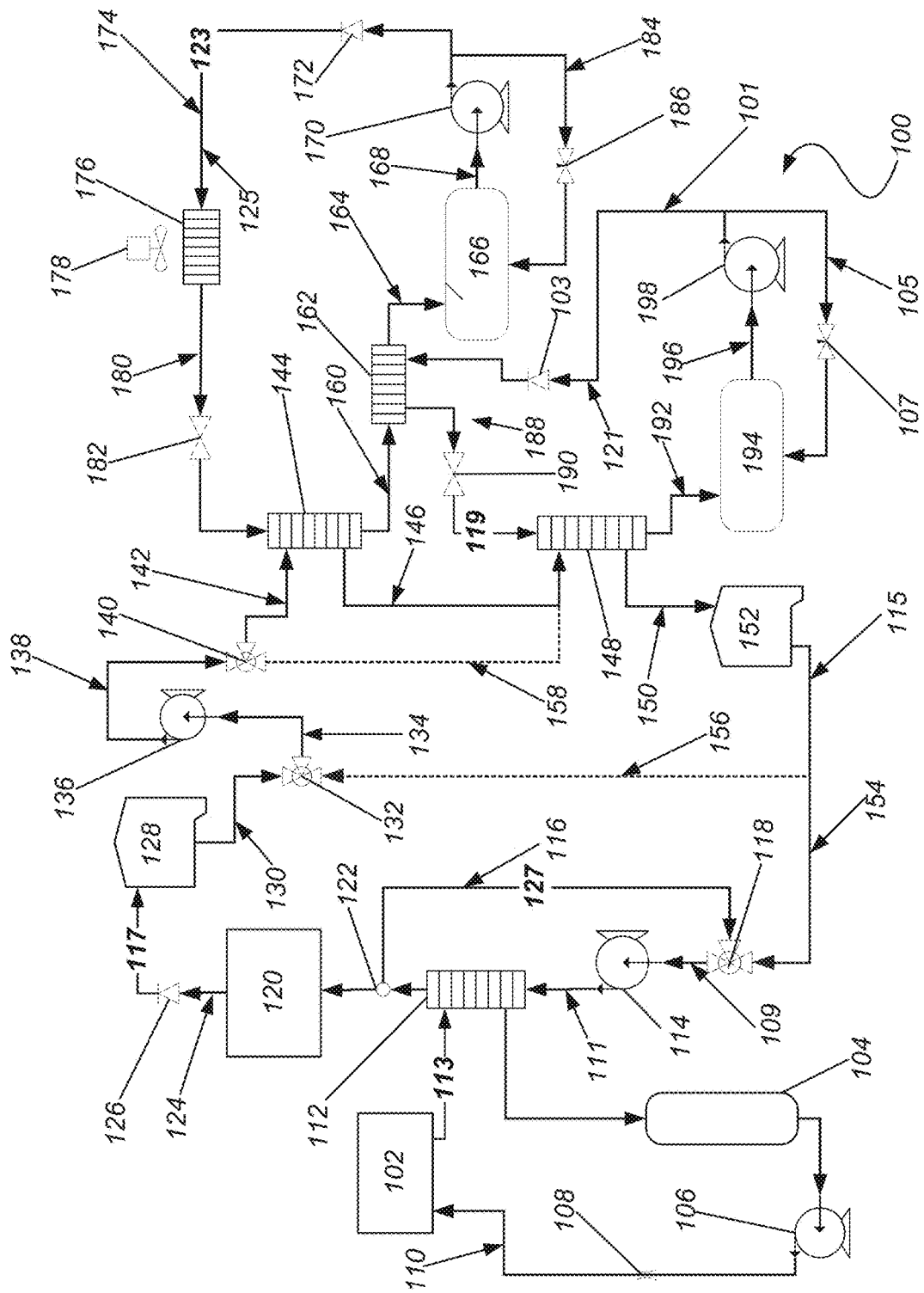
FIG. 1 illustrates a schematic of an example of a thermal management system ("TMS") configured to cool two or more thermal loads.

The drawings described herein are for illustration purposes only and are not intended to limit the scope of the present disclosure in any way.

DETAILED DESCRIPTION

According to an example of the present disclosure, a thermal management system includes a main thermal energy storage ("TES") loop, and a vapor compression system ("VCS") loop thermally coupled to an ambient environment. The main thermal energy storage ("TES") loop includes a TES medium disposed in a TES medium flow path, the TES medium flow path including, in a direction of TES medium fluid flow: a heat exchanger pump, a heat exchanger, a first tank, a first evaporator, a second evaporator, and a second tank. The heat exchanger is configured to transfer heat from a primary thermal load to the TES medium. A secondary thermal load is disposed on the main TES loop. The first evaporator and the second evaporator are configured to transfer heat from the TES medium to the VCS loop. The VCS loop includes the first evaporator, the second evaporator, a VCS condenser, and a VCS fluid disposed in the VCS loop, and the VCS loop is configured to transfer heat from the main TES loop to the ambient environment by the VCS condenser. The main TES loop and the VCS loop are configured to maintain the TES medium in the second tank at a temperature at least a predetermined temperature difference lower than the temperature of the TES medium in the first tank during operation of the thermal management system.

Such a thermal management system may be smaller and/or weigh less than many conventional thermal management systems having similar capabilities.

According to another example of the present disclosure, a method of transferring heat from a primary thermal load and a second thermal load to an ambient environment includes the steps of: transferring heat from the primary thermal load to a heat exchanger; transferring heat from the heat exchanger to a TES medium disposed in a main TES loop including a heat exchanger pump, the heat exchanger, a first tank, a first evaporator, a second evaporator, and a second tank; transferring heat from the secondary thermal load in the main TES loop to the TES medium; transferring heat from the TES medium to a VCS fluid disposed in a VCS loop via the first evaporator and the second evaporator; transferring heat from the VCS loop to the ambient environment via a VCS condenser in the VCS loop; and accumulating the TES medium to a predetermined volume set point in the second tank at a temperature at least a predetermined temperature difference lower than the temperature of the TES medium in the first tank.

According to yet another example of the present disclosure, a thermal management system includes a main TES loop, a VCS loop thermally coupled to an ambient environment, and a processor. The main TES loop includes a TES medium disposed in a TES medium flow path, the TES medium flow path including, in a direction of TES medium flow: a heat exchanger pump, a heat exchanger configured to transfer heat from a primary thermal load, a first tank, a first evaporator, a second evaporator, and a second tank. The heat exchanger is configured to transfer heat from a primary thermal load to the TES medium. A secondary thermal load is disposed on the main TES loop. The first evaporator and the second evaporator are configured to transfer heat from the TES medium to the VCS loop. The VCS loop includes the first evaporator, the second evaporator, a VCS condenser, and a VCS fluid disposed in the VCS loop, and the VCS loop is configured to transfer heat from the main TES loop to the ambient environment by the VCS condenser. The processor is configured to cause: the heat exchanger to transfer heat from the primary thermal load to the TES medium; the main TES loop to transfer heat from the secondary thermal load to the TES medium; the first evaporator and the second evaporator to transfer heat from the TES medium to the VCS loop; the VCS condenser to transfer heat from the VCS loop to the ambient environment; and the main TES loop to accumulate the TES medium in the second tank to a predetermined volume set point at a temperature at least a predetermined temperature difference lower than the temperature of the TES medium in the first tank during operation of the thermal management system.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

FIG. 1 illustrates a schematic of an example of a thermal management system 100 to cool a transient heat load, for example, primary thermal load 102. Primary thermal load 102 may represent two or more parallel thermal loads. Thermal management system 100 includes a two-phase pump loop ("TPPL," or "TPP loop") 110. The TPP loop 110 includes primary thermal load 102 disposed thereon. TPP loop 110 includes a primary fluid disposed in the TPP loop 110 that may include a liquid-phase primary fluid, a vapor-phase primary fluid, or a mixture of liquid- and vapor-phase primary fluid. The primary fluid may advantageously absorb heat from the primary thermal load 102 through the latent heat of vaporization. Thermal management system 100 further includes main thermal energy storage ("TES") loop 115. Main TES loop 115 includes secondary thermal load 120 disposed thereon. Main TES loop 115 includes a TES medium disposed in main TES loop 115, and may absorb heat from TPP loop 110 and secondary thermal load 120. Thermal management system 100 further includes low-temperature vapor compression system ("VCS") loop 121, which may additionally be referred to as a "first VCS loop," and high-temperature VCS loop 125, which may additionally be referred to as a "second VCS loop." Each of low-temperature VCS loop 121 and high-temperature VCS loop 125 absorbs a portion of the heat load from main TES loop 115. Low-temperature VCS loop 121 absorbs a portion of the heat load from main TES loop 115 by vaporizing a fluid disposed in low-temperature VCS loop 121, then compressing the vapor-phase fluid in a compressor to raise its temperature so as to reject heat to high-temperature VCS loop 125. High-temperature VCS loop 125 absorbs a portion of the heat load from main TES loop 115 and the heat load from low-temperature VCS loop 121 by vaporizing fluid disposed in high-temperature VCS loop 125, then compressing the vapor-phase fluid in a compressor to raise its temperature so as to reject heat to the ambient environment. Each of the TPP loop 110, main TES loop 115, low-temperature VCS loop 121 and high-temperature VCS loop 125 may include various components configured to transfer heat from one location and dispose of, or reject, the heat into another location.

For example, various components of TPP loop 110 other than primary thermal load 102 may include TPPL condenser 112, TPPL accumulator 104, and TPPL liquid pump 106. The TPP loop 110 may be arranged such that each subsequent component, as listed in the order above, may be located downstream of the prior components, on primary fluid flow path 113 and the effluent of primary thermal load 102 ultimately being returned to TPPL condenser 112 after flowing around TPP loop 110. TPPL condenser 112 may include a first TPPL condenser inlet, a second TPPL condenser inlet, a first TPPL condenser outlet, and a second TPPL condenser outlet. TPPL accumulator 104 may include a TPPL accumulator inlet and a TPPL accumulator outlet. TPPL liquid pump 106 may include a TPPL liquid pump inlet and a TPPL liquid pump outlet.

Each of the above various components forming the TPP loop 110 may be in fluid communication with, and/or coupled to, one another via one or more conduits. The one or more conduits may be insulated. For example, the first TPPL condenser outlet may be in fluid communication with, and/or coupled to, the TPPL accumulator inlet by a TPPL-condenser-TPPL-accumulator conduit; the TPPL accumulator outlet may be in fluid communication with, and/or coupled to, the TPPL liquid pump inlet by a TPPL-accumulator-TPPL-liquid-pump conduit; and the TPPL liquid pump outlet may be in fluid communication with, and/or coupled to, the first TPPL condenser inlet by a TPPL-liquid-pump-TPPL-condenser conduit. The primary thermal load 102 may be disposed on the TPPL-liquid-pump-TPPL-condenser conduit. TPPL-liquid-pump-TPPL-condenser conduit may further include restriction 108, which may provide a pressure drop in primary fluid passing through TPPL-liquid-pump-TPPL-condenser conduit.

TPP loop 110 may include additional components and/or conduits, some of which are described herein. Primary fluid flow path 113 may be a closed fluid flow path, meaning that thermal management system 100 is designed such that the primary fluid does not intentionally enter or leave TPP loop 110 during operation. Being characterized as "closed" does not prohibit, however, primary fluid from being added to or removed from TPP loop 110 to make up for leaks, change of the primary fluid after fluid degradation, or for some other maintenance or repair procedure.

The primary fluid disposed in the TPP loop 110 may be any substance suitable for use in TPP loop 110. In other words, the primary fluid may be any substance having a vapor-to-liquid-phase transition temperature that is in the range of the temperature at which the primary thermal load 102 is desired to be maintained. The primary fluid may, without limitation, be suitable for use in a coolant and/or refrigeration system. Several examples of a primary fluid may include, but not be limited to, a chlorofluorocarbon ("CFC"), a hydrochlorofluorocarbon ("HCFC"), a hydrofluorocarbon ("HFC"), a hydrofluoroolefine ("HFO"), difluoromethane, difluoroethane, or a combination thereof. When desirable, examples of the primary fluid may include R134a, R236fa, H1234yf, R1234ze(E), R1234zd, R1234ze (Z), R123, R410, methanol, acetone, ammonia, and carbon dioxide ($CO_2$).

TPPL condenser 112 may be a heat exchanger that rejects and/or transfers heat from primary thermal load 102 or two or more multiple parallel thermal loads or the primary fluid to a heat sink, which may be, for example, the TES medium. Examples of TPPL condenser 112 may include a parallel-flow, counter-flow, multi-pass-flow, and cross-flow heat exchanger. The primary fluid may run in hot-side channels of TPPL condenser 112, and more specifically primary fluid may be received through first TPPL condenser inlet and flow out through first TPPL condenser outlet. Cold-side channels of TPPL condenser 112 may be filled with the TES medium, and more specifically the TES medium may be received through second TPPL condenser inlet and flow out through second TPPL condenser outlet.

TPPL accumulator 104 may be a reservoir downstream of TPPL condenser 112 that performs many functions in thermal management system 100, including, but not limited to, providing pump head to TPPL liquid pump 106, providing a storage reservoir for the primary fluid, accommodating changes in liquid/vapor distribution through the rest of the TPP loop 110, and/or separating two-phase (for example, vapor-liquid) mixtures of the primary fluid into a vapor-phase primary fluid and a liquid-phase primary fluid. Liquid-phase primary fluid leaving TPPL accumulator 104 through the TPPL accumulator outlet may flow to TPPL liquid pump inlet.

Primary fluid leaving TPPL accumulator 104 through TPPL accumulator outlet may flow to TPPL liquid pump 106, which may be downstream from TPPL accumulator 104 and disposed on TPP loop 110. TPPL liquid pump 106 may raise the pressure of the primary fluid and may provide workflow to move the primary fluid downstream within the TPP loop 110.

Main TES loop 115 may be a low-temperature heat sink for the TPP loop 110. Main TES loop 115 may include one or more loops that may be in fluid communication with, and/or coupled to, one another. Further, main TES loop 115 may include one or more loops that may be in fluid communication with, and/or coupled to, the second TPPL condenser inlet and the second TPPL condenser outlet of TPPL condenser 112. Main TES loop 115 may also include secondary thermal load 120 disposed on main TES loop 115. Each loop of main TES loop 115 may include various components configured to transfer heat from one location and dispose of, or reject, the heat into another location. For example, various components of main TES loop 115 may include warm-temperature tank 128, recharge pump 136, high-temperature evaporator 144, low-temperature evaporator 148, cold-temperature tank 152, and TPPL condenser pump 114 disposed between second TPPL condenser outlet and second TPPL condenser inlet. TPPL condenser pump 114 may also be referred to as a "heat exchanger pump." Warm-temperature tank 128 may also be referred to as a "first tank." Low-temperature evaporator 148 may also be referred to as a "second evaporator." High-temperature evaporator 144 may also be referred to as a "first evaporator." Cold-temperature tank 152 may also be referred to as a "second tank." TES medium flow path 117 may be arranged such that each subsequent component, as listed in the order above, may be located downstream of the prior components, and the effluent of TPPL condenser 112 ultimately being returned to TPPL condenser 112 after flowing around main TES loop 115. Accordingly, TPP loop 110 and main TES loop 115 may be thermally coupled by TPPL condenser 112. Alternatively, main TES loop 115 may be thermally coupled to primary thermal load 102 by TPPL condenser 112 or any "heat exchanger" configured to transfer heat from primary thermal load 102. Warm-temperature tank 128 may include a warm-temperature tank inlet and a warm-temperature tank outlet. Recharge pump 136 may include a recharge pump inlet and a recharge pump outlet. High-temperature evaporator 144 may include a first high-temperature evaporator inlet, a second high-temperature evaporator inlet, a first high-temperature evaporator outlet, and a second high-temperature evaporator outlet. Low-temperature evaporator 148 may include a first low-temperature evaporator inlet, a second low-temperature evaporator inlet, a first low-temperature evaporator outlet, and a second low-temperature evaporator outlet. Cold-temperature tank 152 may include a cold-temperature tank inlet, a cold-temperature tank outlet, and one or more sensors to detect depth, volume, and/or temperature of the TES medium in cold-temperature tank 152 at one or more respective set points. TPPL condenser pump 114 may include TPPL condenser pump inlet and TPPL condenser pump outlet.

Each of the above various components forming main TES loop 115 may be in fluid communication with, and/or coupled to, one another via one or more conduits. The one or more conduits may be insulated. Second TPPL condenser outlet may be in fluid communication with, and/or coupled to, warm-temperature tank inlet by second-TPPL-condenser-outlet-warm-temperature-tank-inlet conduit 124. Warm-temperature tank outlet may be in fluid communication with, and/or coupled to, recharge pump inlet by warm-temperature-tank-outlet conduit 130 and recharge-pump-inlet conduit 134. Recharge pump outlet may be in fluid communication with, and/or coupled to, first high-temperature evaporator inlet by recharge-pump-outlet conduit 138 and first-high-temperature-evaporator-inlet conduit 142. First high-temperature evaporator outlet may be in fluid communication with, and/or coupled to, first low-temperature evaporator inlet by evaporator-outlet-evaporator-inlet conduit 146. First low-temperature evaporator outlet may be in fluid communication with, and/or coupled to, cold-temperature tank inlet by evaporator-outlet-cold-temperature-tank-inlet conduit 150. Cold-temperature tank outlet may be in fluid communication with, and/or coupled to, TPPL condenser pump inlet by cold-temperature-tank-outlet conduit 154 and TPPL-condenser-pump-inlet conduit 109. TPPL condenser pump outlet may be in fluid communication with, and/or coupled to, second TPPL condenser inlet by TPPL-condenser-pump-TPPL-condenser conduit 111.

Main TES loop 115 may include additional components and/or conduits, some of which are described herein. TES medium flow path 117 may form a closed fluid path, meaning that thermal management system 100 is designed such that the TES medium does not intentionally enter or leave main TES loop 115 during operation. Being characterized as "closed" does not prohibit, however, the TES medium from being added to or removed from main TES loop 115 to make up for leaks, change of the TES medium after the TES medium degradation, or for some other maintenance or repair procedure.

Cold-temperature tank 152 may include the TES medium at a temperature that is at all times during operation of main TES loop 115 lower than the lowest temperature of the TES medium in warm-temperature tank 128. The temperature of the TES medium flowing from cold-temperature tank 152, or "cold-temperature TES medium," may be, at all times during operation of main TES loop 115, lower than the temperature of any of the TES medium with which the TES medium flowing from cold-temperature tank 152 is mixed so as to lower the temperature of the mixed TES medium. "Cold-temperature TES medium," for example, may be any TES medium flowing downstream of cold-temperature tank 152 and upstream of mix valve 118 and first three-way valve 132. "Warm-temperature TES medium," for example, may be any TES medium flowing downstream of TPPL condenser 112 and secondary thermal load 120, and upstream of high-temperature evaporator 144 and low-temperature evaporator 148.

During operation of the thermal management system 100, the temperature difference between the TES medium in the cold-temperature tank 152 and the warm-temperature tank 128 may be maintained to be at least a predetermined temperature difference. The predetermined temperature difference may be maintained by controlling flow of the TES medium through first three-way valve 132 to bypass TPPL condenser 112 and TPPL condenser pump 114 and secondary thermal load 120. Alternatively, or in addition, the predetermined temperature difference may be maintained by controlling flow of the TES medium through second three-way valve 140 to bypass high-temperature evaporator 144. Alternatively, or in addition, the predetermined temperature difference may be maintained by controlling flow of the low-temperature VCS fluid through first expansion valve 190 to low-temperature evaporator 148, across which heat may be transferred from the TES medium to the low-temperature VCS fluid. Alternatively, or in addition, the predetermined temperature difference may be maintained by controlling flow of the high-temperature VCS fluid through second expansion valve 182 to high-temperature evaporator 144, across which heat may be transferred from the TES medium to the high-temperature VCS fluid. Alternatively, or in addition, the predetermined temperature difference may be maintained by controlling the flow rate through recharge pump 136. The predetermined temperature difference is selected such that the TES medium in the cold-temperature tank 152 is colder than in the warm-temperature tank 128. Examples of the predetermined temperature difference may be 5, 10, 15, 20, 30, 40, 60, 80, 100, 120, 140, 160, 180, or 200 degrees Celsius. Alternatively, the predetermined temperature difference may be any other temperature difference in other examples. The actual temperature difference between the TES medium in cold-temperature tank 152 and warm-temperature tank 128 may vary during operation of thermal management system 100 as thermal management system 100 maintains at least the predetermined temperature difference. Further, the predetermined temperature difference may itself vary during operation of thermal management system 100. The predetermined temperature difference may be a function of one or more system parameters such as temperature of TES medium in warm-temperature tank 128 and/or temperature of the primary fluid in the TPP loop 110, among other parameters.

Conduit junction 122 may be disposed in second-TPPL-condenser-outlet-warm-temperature-tank-inlet conduit 124 downstream of second TPPL condenser outlet. Secondary thermal load 120 may be disposed in second-TPPL-condenser-outlet-warm-temperature-tank-inlet conduit 124, and additionally may be disposed downstream of conduit junction 122. Valve 126 may be disposed in second-TPPL-condenser-outlet-warm-temperature-tank-inlet conduit 124, and additionally may be disposed downstream of secondary thermal load 120. In certain examples, valve 126 may be a check valve with a cracking pressure, or a back-pressure regulator, or other suitable means for supporting condenser pump recirculation loop 127. First three-way valve 132 may be disposed between warm-temperature-tank-outlet conduit 130 and recharge-pump-inlet conduit 134 such that first three-way valve 132 may be in fluid communication with, and/or coupled to, each of warm-temperature-tank-outlet conduit 130 and recharge-pump-inlet conduit 134. Second three-way valve 140 may be disposed between recharge-pump-outlet conduit 138 and first-high-temperature-evaporator-inlet conduit 142 such that second three-way valve 140 may be in fluid communication with, and/or coupled to, each of recharge-pump-outlet conduit 138 and first-high-temperature-evaporator-inlet conduit 142. Mix valve 118 may be disposed between cold-temperature-tank-outlet conduit 154 and TPPL-condenser-pump-inlet conduit 109 such that mix valve 118 may be in fluid communication with, and/or coupled to, each of cold-temperature-tank-outlet conduit 154 and TPPL-condenser-pump-inlet conduit 109. Alternatively, mix valve 118 may be located downstream of secondary thermal load 120 and be configured as a split valve.

Conduit-junction-mix-valve conduit 116 may be in fluid communication with, and/or coupled to, each of conduit junction 122 and mix valve 118, thereby forming condenser pump recirculation loop 127 including mix valve 118, TPPL condenser pump 114, TPPL condenser 112, conduit junction 122, and conduit-junction-mix-valve conduit 116. Each of mix valve 118, first three-way valve 132, and second three-way valve 140 may alternatively represent one or more separate valves and components configured to perform operations identical to, respectively, each of mix valve 118, first three-way valve 132, and second three-way valve 140.

It is expected that when the TES medium is fully charged, the cold-temperature tank 152 may be nearly filled with the cold-temperature TES medium and the warm-temperature tank 128 may be nearly empty of the TES medium. As cooling is performed, the cold-temperature TES medium flows from cold-temperature tank 152 to TPPL condenser 112 and secondary thermal load 120 to absorb heat from TPP loop 110 and secondary thermal load 120. The warm-temperature TES medium is then collected in the warm-temperature tank 128, then subsequently cooled by high-temperature evaporator 144 and low-temperature evaporator 148 and returned to cold-temperature tank 152 at a target cold-temperature tank temperature.

The TES medium may include, but not be limited to, a mixture of water with any fluid that is soluble, dispersible, or miscible with the water. Several examples of such a fluid or fluid mixture, include, but are not limited to, water, ethylene glycol, propylene glycol, glycerol, alcohol, or mixtures thereof, such as water-ethylene glycol ("EGW"), water-propylene glycol ("PGW"), water-glycerol, and water-alcohol. Alternatively, the fluid or fluid mixture includes vehicle fuel. The TES medium is in liquid phase during operation of the examples of thermal management systems of the present disclosure.

It is desirable that the TES medium in the cold-temperature tank 152 may be maintained at a low temperature and the warm-temperature TES medium not be mixed back into cold-temperature tank 152. Instead, it is desirable that the warm-temperature TES medium may be collected in warm-temperature tank 128 for storage. The warm-temperature TES medium may then be chilled and returned to cold-temperature tank 152 at the desired cold-temperature operating condition of cold-temperature tank 152.

So as to advantageously minimize the thermal energy storage size and weight, the temperature of the TES medium in the cold-temperature tank 152 may advantageously be as low as possible. Further, the temperature of the TES medium in the warm-temperature tank 128 may advantageously be as high as possible. Accordingly, the difference in temperature between the TES medium in the cold-temperature tank 152 and the TES medium in the warm-temperature tank 128 may advantageously be as high as possible. By maximizing the temperature difference between the TES medium in the warm-temperature tank 128 and the TES medium in the cold-temperature tank 152, the amount of the TES medium required to absorb the heat may be minimized. Further, the TES medium maintained at a very low temperature in cold-temperature tank 152 may enable a larger temperature difference between the heat sources in secondary thermal load 120 and TPPL condenser 112 at all times of operation, which may provide several benefits. For example, the maximum TES medium flow rates are greatly reduced, which may enable a smaller recharge pump 136 and a smaller TPPL condenser pump 114 and less pumping power. Additionally, larger temperature difference between the cold-temperature TES medium and the warm-temperature TES medium may provide a larger temperature difference across heat exchangers, which may enable smaller heat exchangers. Smaller heat exchangers may result in reduced system power consumption and reduced system mass and volume relative to a TES loop including a single tank with the TES medium starting at the same minimum low temperature as the TES medium in cold-temperature tank 152 operating at minimum temperature. In a thermal energy storage loop including a single tank, the TES medium will increase in temperature as a heat exchanger thermally coupled to a loop including a thermal load and a second thermal load on the TES loop add heat beyond what may be removed by a vapor compression system. Therefore, the single tank will operate at higher temperatures than the dual tank design of main TES loop 115 of examples of the present disclosure, resulting in the need for larger flow rates, larger pumps and larger pipes.

The TPPL condenser pump 114 may be assumed to be operating at a fixed speed, corresponding to an approximately constant flow rate. Further, the temperature of the primary fluid leaving the TPPL condenser 112 through the first TPPL condenser outlet may advantageously be at a target temperature ("$T_{goal,TPPL}$"). When the primary fluid needs very little cooling, due to a low heat load on the primary fluid, the temperature of the TES medium in condenser pump recirculation loop 127 may be slightly lower than $T_{goal,TPPL}$, for example, 1 degree Celsius lower, or 2 degrees Celsius lower may be sufficient in order to absorb the small amount of heat. The temperature of the TES medium entering TPPL condenser 112 should be such that the difference in temperature between the TES medium and $T_{goal,TPPL}$ is sufficient to remove the heat from the primary fluid while maintaining $T_{goal,TPPL}$. Accordingly, the flow in condenser pump recirculation loop 127 may simply recirculate with only a tiny amount of the cold-temperature TES medium flowing from cold-temperature tank 152 through cold-temperature-tank-outlet conduit 154 and mix valve 118. The slight inlet of the cold-temperature TES medium at mix valve 118 may concomitantly require an equivalent slight amount of the TES medium to flow out of condenser pump recirculation loop 127 through conduit junction 122 at a temperature of approximately $T_{goal,TPPL}$. Accordingly, the inlet flow to condenser pump recirculation loop 127 may be at an extremely low temperature, but the temperature of the TES medium flowing out of condenser pump recirculation loop 127 through conduit junction 122 and to the high temperature tank may approximate the heat source temperature. When the flow rate of condenser pump recirculation loop 127 is high, the heat transfer coefficient of the TPPL condenser 112 may likewise be high. When the primary thermal load 102 is reduced, the TPPL condenser pump 114 flow rate may be reduced so as to conserve power. In some examples of thermal management system 100, condenser pump recirculation loop 127 may be substituted with a variable-speed TPPL condenser pump, which may advantageously reduce power and provide a main TES loop with less components.

Mix valve 118 may include the warm-temperature TES medium entering mix valve 118 through conduit-junction-mix-valve conduit 116 and the cold-temperature TES medium entering mix valve 118 through cold-temperature-tank-outlet conduit 154. Mix valve 118 may deliver a targeted exit temperature $T_{goal,MV}$ by advantageously and independently controlling the flow rate of the warm-temperature TES medium and the flow rate of the cold-temperature TES medium entering mix valve 118. So as to advantageously attain $T_{goal,TPPL}$, a control system, such as processor 210, may vary $T_{goal,MV}$. As the primary thermal load 102 increases, the $T_{goal,MV}$ may be lowered, and more of the TES medium may flow from cold-temperature tank 152 to condenser pump recirculation loop 127 through mix valve 118. However, if TPP loop 110 is reasonably effective in absorbing primary thermal load 102, the temperature of the TES medium exiting TPPL condenser 112 through second TPPL condenser outlet may approximate $T_{goal,TPPL}$. Due to the relative low temperature of the TES medium in the cold-temperature tank 152, TPPL condenser 112 may be designed to be highly effective while still advantageously being of smaller size than a condenser used on a TES loop including a single tank, in which the TES medium may rise to temperatures approximating or approaching $T_{goal,TPPL}$.

By including both cold-temperature tank 152 and warm-temperature tank 128, cold-temperature tank 152 and warm-temperature tank 128 enable the use of lower flow rates of TES medium, which may enable both tanks to be operated at atmospheric pressure, while still maintaining components of practical size. Cold-temperature tank 152 and warm-temperature tank 128 may be insulated. The relatively low flow rate of the cold-temperature TES medium from cold-temperature tank 152 may advantageously result in only minor losses of pressure in a relatively small mix valve 118. Tanks at atmospheric pressure may advantageously enable lighter-weight tanks. Further, tanks at atmospheric pressure may be shaped as rectangular prisms or cuboid, which may advantageously enable the use of more efficient thermal insulation that may require less volume and/or enable better packing efficiency of the tanks.

So as to recharge main TES loop 115, recharge pump 136 may provide flow rate to transfer the warm-temperature TES medium flowing from warm-temperature tank 128 through high-temperature evaporator 144 and low-temperature evaporator 148. The respective flow rates of the TES medium into and out of the warm-temperature tank 128 and cold-temperature tank 152 may not be equal. To advantageously minimize pressure differences between the warm-temperature tank 128 and cold-temperature tank 152 and minimize venting to the ambient environment, a line (not shown) may connect the air and/or vapor portion of the warm-temperature tank 128 and cold-temperature tank 152.

Thermal management system 100 is designed to charge or recharge main TES loop 115 so as to provide the "pre-cooled" cold-temperature TES medium in cold-temperature tank 152 prior to primary thermal load 102 being generated.

First three-way valve 132 and second three-way valve 140 are disposed in main TES loop 115 so as to provide for recharging of cold-temperature tank 152 during non-standard operation of main TES loop 115. For example, if a significant amount of time has passed without using the cold-temperature TES medium in condenser pump recirculation loop 127, heat may be absorbed from the environment into the cold-temperature tank 152 and increase the temperature of the cold-temperature TES medium in the cold-temperature tank 152 to an unacceptable temperature. In this instance, cold-temperature tank 152 will need to be recharged. First three-way valve 132 may be set to allow some or all of the cold-temperature TES medium in the cold-temperature tank 152 to bypass secondary thermal load 120 and TPPL condenser 112 by cold-temperature-tank-outlet-first-three-way-valve conduit 156. Cold-temperature-tank-outlet-conduit-first-three-way-valve conduit 156 may be in fluid communication with, and/or coupled to, each of cold-temperature-tank-outlet conduit 154 and first three-way valve 132. Second three-way valve 140 may be used to control how much of the TES medium flows through high-temperature evaporator 144. When thermal management system 100 is in operation on a hot day, such that thermal management system 100, or primary thermal load 102 and secondary thermal load 120, is "heat-soaked," the TES medium may flow through both high-temperature evaporator 144 and low-temperature evaporator 148. However, if cold-temperature tank 152 increases in temperature only a few degrees and requires recharging, the TES medium may flow through only low-temperature evaporator 148. Accordingly, second three-way valve 140 may be in fluid communication with, and/or coupled to, evaporator-outlet-evaporator-inlet conduit 146 and second three-way valve 140 may be positioned so as to prohibit or limit flow through first-high-temperature-evaporator-inlet conduit 142 and provide all or nearly all flow through high-temperature-evaporator-bypass conduit 158 to low-temperature evaporator 148.

As illustrated in FIG. 1, low-temperature VCS loop 121 and high-temperature VCS loop 125 may be arranged in a cascaded architecture, such that low-temperature VCS loop 121 rejects heat into high-temperature VCS loop 125, which in turn rejects heat to the ambient environment. By implementing low-temperature VCS loop 121 and high-temperature VCS loop 125 in such a cascaded architecture, the TES medium in cold-temperature tank 152 may advantageously reach a lower temperature, thereby reducing the size and weight of cold-temperature tank 152. Further, by implementing low-temperature VCS loop 121 and high-temperature VCS loop 125 in such a cascaded architecture, cooling efficiency may be advantageously increased. In some examples of thermal management system 100, instead of a cascaded architecture, a multistage compression system including a flash chamber may be implemented. Various vapor compression systems or multistage compression systems may be integrated into the architecture of examples of thermal management systems of the present disclosure with additional, fewer, or different components than illustrated in FIGS. 1 through 8, and configured to transfer heat from main TES loop 115 to the ambient environment while providing advantageous various operational opportunities including those illustrated within the present disclosure.

Low-temperature VCS loop 121 may be a low-temperature heat sink for main TES loop 115. Low-temperature VCS loop 121, or the "first VCS loop," is characterized in that low-temperature VCS loop 121 includes a low-temperature VCS fluid, which may be referred to as a "first VCS fluid," disposed on low-temperature VCS fluid flow path 119, wherein the low-temperature VCS fluid is operated at a lower saturation temperature in low-temperature evaporator 148 than the saturation temperature in high-temperature evaporator 144. Low-temperature VCS loop 121 illustrated in FIG. 1 is just one example of a VCS loop, and components of low-temperature VCS loop 121 may be arranged in various ways to achieve the goals of the vapor compression system to cool the TES medium in main TES loop 115 and transfer heat from the TES medium across low-temperature evaporator 148, and to high-temperature VCS loop 125 and ultimately the ambient environment. The saturation temperature of low-temperature evaporator 148 of the low-temperature VCS fluid is less than the temperature of the TES medium at any point during operation, such that heat is transferred from the TES medium to the low-temperature VCS fluid, thereby vaporizing the low-temperature VCS fluid. Low-temperature VCS loop 121 may include one or more loops that may be in fluid communication with, and/or coupled to, one another. Further, low-temperature VCS loop 121 may include one or more loops that may be in fluid communication with, and/or coupled to, the second low-temperature evaporator inlet and the second low-temperature evaporator outlet. Accordingly, low-temperature VCS loop 121 may be thermally coupled to main TES loop 115 by low-temperature evaporator 148. Low-temperature evaporator 148 may evaporate some or all of the low-temperature VCS fluid passing through low-temperature evaporator 148, thereby transferring heat from the TES medium to low-temperature VCS fluid. Low-temperature VCS loop 121 may include various components configured to transfer heat from one location and dispose of, or reject, the heat into another location. For example, various components of low-temperature VCS loop 121 may include low-temperature VCS accumulator 194, which may be referred to as a "first VCS accumulator," low-temperature VCS compressor 198, which may be referred to as a "first VCS compressor," and low-temperature VCS condenser 162, which may be referred to as a "first VCS condenser," disposed between second low-temperature evaporator outlet and second low-temperature evaporator inlet. Low-temperature VCS loop 121 may be arranged such that each subsequent component, as listed in the order above, may be located downstream of the prior components, and the effluent of low-temperature evaporator 148 ultimately being returned to low-temperature evaporator 148 after flowing around low-temperature VCS loop 121. Low-temperature VCS accumulator 194 may include a first low-temperature VCS accumulator inlet, a second low-temperature VCS accumulator inlet, and a low-temperature VCS accumulator outlet, and may be alternatively located in different positions around low-temperature VCS loop 121. Low-temperature VCS compressor 198 may include a low-temperature compressor inlet and a low-temperature compressor outlet. Low-temperature VCS condenser 162 may include a first low-temperature condenser inlet, a second low-temperature condenser inlet, a first low-temperature condenser outlet, and a second low-temperature condenser outlet.

Each of the above various components forming low-temperature VCS loop 121 may be in fluid communication with, and/or coupled to, one another via one or more conduits. The one or more conduits may be insulated. Second low-temperature evaporator outlet may be in fluid communication with, and/or coupled to, first low-temperature VCS accumulator inlet by low-temperature-evaporator-VCS-accumulator conduit 192. Low-temperature VCS accumulator outlet may be in fluid communication with, and/or coupled to, low-temperature compressor inlet by low-temperature-VCS-accumulator-compressor conduit 196. Low-temperature compressor outlet may be in fluid communication with, and/or coupled to, first low-temperature condenser inlet by low-temperature-compressor-condenser conduit 101. First low-temperature condenser outlet may be in fluid communication with, and/or coupled to, second low-temperature evaporator inlet by low-temperature-condenser-evaporator conduit 188. Low-temperature VCS loop 121 may further include first-flow-control conduit 105 in fluid communication with, and/or coupled to, each of low-temperature-compressor-condenser conduit 101 and second low-temperature VCS accumulator inlet. First expansion valve 190 may be disposed on low-temperature-condenser-evaporator conduit 188. Examples of first expansion valve 190 may include a thermal expansion valve and an electronic expansion valve. First flow control valve 107 may be disposed on first-flow-control conduit 105. First valve 103 may be disposed on low-temperature-compressor-condenser conduit 101. First valve 103 may be a check valve.

Low-temperature VCS loop 121 may include additional components and/or conduits, some of which are described herein. Low-temperature VCS loop 121 may form a closed fluid flow path, meaning that thermal management system 100 is designed such that the low-temperature VCS fluid does not intentionally enter or leave low-temperature VCS loop 121 during operation. Being characterized as "closed" does not prohibit, however, low-temperature VCS fluid from being added to or removed from low-temperature VCS loop 121 to make for leaks, change of the low-temperature VCS fluid after low-temperature VCS fluid degradation, or for some other maintenance or repair procedure.

During operation of low-temperature VCS loop 121, low-temperature VCS fluid absorbs heat from the TES medium via low-temperature evaporator 148. Low-temperature VCS fluid flowing out of second low-temperature evaporator outlet may be vaporized by absorbing heat across low-temperature evaporator 148 and may flow to low-temperature VCS accumulator 194.

Low-temperature VCS accumulator 194 may be a reservoir that performs many functions in thermal management system 100, including, but not limited to, providing vapor-phase low-temperature VCS fluid to low-temperature VCS compressor 198, and/or separating two-phase (for example, vapor-liquid) mixtures of the low-temperature VCS fluid into vapor-phase and liquid-phase low-temperature VCS fluid. Low-temperature VCS compressor 198 may raise the temperature of the low-temperature VCS fluid as the pressure of low-temperature VCS fluid is raised, so as to reject heat to high-temperature VCS loop 125 across low-temperature VCS condenser 162.

Low-temperature VCS condenser 162 may receive the higher-temperature/pressure low-temperature VCS fluid from low-temperature VCS compressor 198. Low-temperature VCS condenser 162 may be a heat exchanger that rejects heat from the low-temperature VCS fluid to a heat sink, which may be, for example, high-temperature VCS fluid. Examples of low-temperature VCS condenser 162 may include a parallel-flow, counter-flow, multi-pass-flow, and cross-flow heat exchanger. Low-temperature VCS condenser 162 may be a gas cooler. The low-temperature VCS fluid may run in hot-side channels of low-temperature VCS condenser 162. Cold-side channels of low-temperature VCS condenser 162 may be filled with fluid from a heat sink, for example, high-temperature VCS fluid.

Low-temperature VCS compressor 198 raises the pressure of low-temperature VCS fluid from low-temperature VCS accumulator 194. This increase in pressure may be used to provide the workflow required to circulate the low-temperature VCS fluid within low-temperature VCS loop. Raising the pressure of the low-temperature VCS fluid may also raise the temperature of the low-temperature VCS fluid, thereby allowing heat to be rejected from the low-temperature VCS fluid in low-temperature VCS condenser 162. In other examples, low-temperature VCS compressor 198 may be any mechanical device that increases a pressure of a vapor. Low-temperature VCS compressor 198 may be used in conjunction with an oil separator when desirable. Examples of low-temperature VCS compressor 198 may include, but not be limited to, any gas compressor, such as a positive displacement compressor, a dynamic compressor, a rotary compressor, a reciprocating compressor, a centrifugal compressor, an axial compressor, and/or any combination thereof. The low-temperature VCS fluid exiting low-temperature VCS condenser 162 through first low-temperature condenser outlet may flow through first expansion valve 190 before returning to low-temperature evaporator 148, thereby lowering the pressure of the low-temperature VCS fluid, and consequently, also the temperature of the low-temperature VCS fluid. First flow control valve 107 may be open, partially open, or closed so as to advantageously adjust flow of low-temperature VCS fluid on first-flow-control conduit 105 back to low-temperature VCS accumulator 194.

Low-temperature VCS fluid may be any substance suitable for use in a low-temperature VCS loop. In other words, low-temperature VCS fluid may be any substance suitable for a trans-critical cooling system, and/or a sub-critical cooling system. Examples of low-temperature VCS fluid may include, without limitation, carbon dioxide ($CO_2$), anhydrous ammonia, a halomethane, a haloalkane, a hydrofluorocarbon ("HFC"), a chlorofluorocarbon ("CFC"), a hydrochlorofluorocarbon ("HCFC"), a hydrofluoroolefine ("HFO"), any two-phase fluids, and/or a nanofluid. In some examples, low-temperature VCS fluid may include R410a or R407C.

High-temperature VCS loop 125, or "second VCS loop," may be a heat sink for the low-temperature VCS loop. High-temperature VCS loop 125 is characterized in that high-temperature VCS loop 125 includes a high-temperature VCS fluid, which may be referred to as a "second VCS fluid," disposed in high-temperature VCS loop 125, wherein the high-temperature VCS fluid is operated at a saturation temperature in high-temperature evaporator 144 that is lower than the temperature of TES medium entering high-temperature evaporator 144 and that is lower than the saturation temperature of the low-temperature VCS fluid in low-temperature VCS condenser 168, such that heat transferred to the high-temperature VCS fluid from the TES medium across high-temperature evaporator 144 and low-temperature VCS condenser 162 may vaporize the high-temperature VCS fluid. High-temperature VCS loop 125 illustrated in FIG. 1 is just one example of a VCS loop, and components of high-temperature VCS loop 125 may be arranged in various ways to achieve the goals of the vapor compression system to cool the TES medium in main TES loop 115 and transfer heat from the TES medium across high-temperature evaporator 144 and from low-temperature VCS loop 121 across low-temperature VCS condenser 168 and ultimately to the ambient environment across high-temperature VCS condenser 176. High-temperature VCS loop 125 may include one or more loops that may be in fluid communication with, and/or coupled to, one another. Further, high-temperature VCS loop 125 may include one or more loops that may be in fluid communication with, and/or coupled to, the second high-temperature evaporator inlet, the second high-temperature evaporator outlet, the second low-temperature condenser inlet, and the second low-temperature condenser outlet. Accordingly, high-temperature VCS loop 125 is thermally coupled to low-temperature VCS loop 121 by low-temperature VCS condenser 162, or the "first VCS condenser," and thermally coupled to main TES loop 115 by high-temperature evaporator 144, or the "first evaporator." High-temperature evaporator 144 may evaporate some or all of the high-temperature VCS fluid passing through high-temperature evaporator 144, thereby transferring heat from the TES medium to the high-temperature VCS fluid. Low-temperature VCS condenser 162 may further heat high-temperature VCS fluid passing through low-temperature VCS condenser 162, thereby transferring heat from the low-temperature VCS fluid to the high-temperature VCS fluid. High-temperature VCS loop 125 may include various components configured to transfer heat from one location and dispose of, or reject, the heat into another location. For example, various components of high-temperature VCS loop 125 may include high-temperature VCS accumulator 166, which may be referred to as a "second VCS accumulator," high-temperature VCS compressor 170, which may be referred to as a "second VCS compressor," and high-temperature VCS condenser 176, which may be referred to as a "second VCS condenser," or a "VCS condenser," disposed between second high-temperature evaporator inlet and second low-temperature condenser outlet. High-temperature VCS fluid flow path 123 may be arranged such that each subsequent component, as listed in the order above, may be located downstream of the prior components, and the effluent of high-temperature evaporator 144 being returned to high-temperature evaporator 144 to after flowing around high-temperature VCS loop 125. High-temperature VCS accumulator 166 may include a first high-temperature VCS accumulator inlet, a second high-temperature VCS inlet, and a high-temperature VCS accumulator outlet, and may be alternatively located in different positions around high-temperature VCS loop 125. High-temperature VCS compressor 170 may include a high-temperature compressor inlet and a high-temperature compressor outlet. High-temperature VCS condenser 176 may include a high-temperature condenser inlet and a high-temperature condenser outlet.

Each of the above various components forming high-temperature VCS loop 125 may be in fluid communication with, and/or coupled to, one another via one or more conduits. The one or more conduits may be insulated. Second high-temperature evaporator outlet may be in fluid communication with, and/or coupled to, second low-temperature condenser inlet by high-temperature-evaporator-low-temperature-condenser conduit 160. Second low-temperature condenser outlet may be in fluid communication with, and/or coupled to, first high-temperature VCS accumulator inlet by low-temperature-condenser-high-temperature-accumulator conduit 164. High-temperature VCS accumulator outlet may be in fluid communication with, and/or coupled to, high-temperature compressor inlet by high-temperature-VCS-accumulator-compressor conduit 168. High-temperature compressor outlet may be in fluid communication with, and/or coupled to, high-temperature condenser inlet by high-temperature-VCS-compressor-condenser conduit 174. High-temperature condenser outlet may be in fluid communication with, and/or coupled to, second high-temperature evaporator inlet by high-temperature-condenser-evaporator conduit 180. High-temperature VCS loop 125 may further include second-flow-control conduit 184 in fluid communication with, and/or coupled to, each of high-temperature-VCS-compressor-condenser conduit 174 and second high-temperature VCS accumulator inlet. Second expansion valve 182 may be disposed on high-temperature-condenser-evaporator conduit 180. Examples of second expansion valve 182 may include a thermal expansion valve and an electronic expansion valve. Second flow control valve 186 may be disposed on second-flow-control conduit 184. Second valve 172 may be disposed on high-temperature-VCS-compressor-condenser conduit 174. Second valve 172 may be a check valve.

High-temperature VCS loop 125 may include additional components and/or conduits, some of which are described herein. High-temperature VCS fluid flow path 123 may be a closed fluid flow path, meaning that thermal management system 100 is designed such that the high-temperature VCS fluid does not intentionally enter or leave high-temperature VCS loop 125 during operation. Being characterized as "closed" does not prohibit, however, high-temperature VCS fluid from being added to or removed from high-temperature VCS loop 125 to make up for leaks, change of the high-temperature VCS fluid after high-temperature VCS fluid degradation, or for some other maintenance or repair procedure.

During operation of high-temperature VCS loop 125, high-temperature VCS fluid absorbs heat from the TES medium via high-temperature evaporator 144 and absorbs heat from low-temperature VCS loop 121 via low-temperature VCS condenser 162. High-temperature VCS fluid flowing out of second low-temperature condenser outlet may be vaporized by absorbing heat across high-temperature evaporator 144 and across low-temperature VCS condenser 162, and flow to high-temperature VCS accumulator 166.

High-temperature VCS accumulator 166 may be a reservoir that performs many functions in thermal management system 100, including, but not limited to, providing vapor-phase high-temperature VCS fluid to high-temperature VCS compressor 170, and/or separating two-phase (for example, vapor-liquid) mixtures of the high-temperature VCS fluid into a vapor-phase high-temperature VCS fluid and a liquid-phase high-temperature VCS fluid. High-temperature VCS compressor 170 may increase the temperature of the high-temperature VCS fluid as the pressure of the high-temperature VCS fluid is raised, so as to reject heat to the ambient environment across high-temperature VCS condenser 176.

High-temperature VCS condenser 176 may receive the higher-temperature/pressure high-temperature VCS fluid from high-temperature VCS compressor 170. High-temperature VCS condenser 176 may be a heat exchanger that rejects heat from the high-temperature VCS fluid to a heat sink, which may be, for example, the ambient environment. Examples of high-temperature VCS condenser 176 may include a parallel-flow, counter-flow, multi-pass-flow, and cross-flow heat exchanger. High-temperature VCS condenser 176 may be a gas cooler. The high-temperature VCS fluid may run in hot-side channels of high-temperature VCS condenser 176. Cold-side channels of high-temperature VCS condenser 176 may be filled with a fluid from a heat sink, for example, ambient air, ambient water, fuel from a fuel tank, or any other heat sink medium. High-temperature VCS condenser 176 may include a forced ventilation unit, such as fan 178, which may increase the flow rate of the heat sink over high-temperature VCS condenser 176. The "sizing" of high-temperature VCS condenser 176 may factor in the addition of the forced ventilation unit, such as fan 178. High-temperature VCS condenser 176 may also include pumps for rejecting heat, for example, to sea water.

High-temperature VCS compressor 170 may raise the pressure of high-temperature VCS fluid from high-temperature VCS accumulator 166. This increase in pressure may be used to provide the workflow required to circulate the high-temperature VCS fluid within high-temperature VCS loop 125. Raising the pressure of the high-temperature VCS fluid may also raise the temperature of the high-temperature VCS fluid, thereby allowing heat to be rejected from the high-temperature VCS fluid in high-temperature VCS condenser 176. In other examples, high-temperature VCS compressor 170 may be any mechanical device that increases a pressure of a vapor. High-temperature VCS compressor 170 may be used in conjunction with an oil separator when desirable. Examples of the high-temperature VCS compressor 170 may include, but not be limited to, any gas compressor, such as a positive displacement compressor, a dynamic compressor, a rotary compressor, a reciprocating compressor, a centrifugal compressor, an axial compressor, and/or any combination thereof. The high-temperature VCS fluid exiting the high-temperature VCS condenser 176 through high-temperature condenser outlet may flow through second expansion valve 182 before returning to high-temperature evaporator 144, thereby lowering the pressure of the high-temperature VCS fluid, and consequently, the temperature of the high-temperature VCS fluid. Second flow control valve 186 may be open, partially open, or closed so as to advantageously adjust flow of high-temperature VCS fluid on second-flow-control conduit 184 back to high-temperature VCS accumulator 166.

High-temperature VCS fluid may be any substance suitable for use in high-temperature VCS loop 125. In other words, high-temperature VCS fluid may be any substance suitable for a trans-critical cooling system, and/or a sub-critical cooling system. High-temperature VCS fluid may be a substance selected for use based on selection of low-temperature VCS fluid, and vice versa. Examples of high-temperature VCS fluid may include, without limitation, carbon dioxide ($CO_2$), anhydrous ammonia, a halomethane, a haloalkane, a hydrofluorocarbon (HFC), a chlorofluorocarbon (CFC), a hydrochlorofluorocarbon (HCFC), a hydrofluoroolefine ("HFO"), any two-phase fluids, and/or a nano-fluid. In some examples, high-temperature VCS fluid may include R134a, R236fa, R245fa, or R1233zd. In further examples, high-temperature VCS fluid may be the same as the low-temperature VCS fluid.

High-temperature VCS loop 125 and low-temperature VCS loop 121 may operate relatively independently from the cooling of the primary thermal load 102 and secondary thermal load 120. Because all heat loads pass through main TES loop 115, primary thermal load 102 and secondary thermal load 120 may be cooled for a period of time without high-temperature VCS loop 125 and low-temperature VCS loop 121 operating. High-temperature VCS loop 125 and low-temperature VCS loop 121 may be operated for peak efficiency, maximum recharge speed, or to achieve some other cooling objective.

Alternatively, though not shown in FIG. 1, thermal management system 100 may include a VCS loop including a high-temperature evaporator, a low-temperature evaporator, and a single VCS condenser thermally coupled to an ambient environment. Such a VCS loop may include one VCS fluid disposed in the VCS loop. The VCS loop may be configured to compress the VCS fluid in different stages, including, for example, compressing the VCS fluid first from approximately the pressure of the VCS at an outlet of low-temperature evaporator 148 to a higher pressure at an outlet of high-temperature evaporator 144, and then further compressing the VCS fluid from the higher pressure at the outlet of high-temperature evaporator 144 and an inlet of high-temperature VCS condenser 176. Such multiple-stage compression may be performed by a single multi-stage compressor or two separate compressors.

Further, once main TES loop 115 is charged by lowering the temperature of the TES medium and most of the TES medium has accumulated in cold-temperature tank 152, low-temperature VCS loop 121 and high-temperature VCS loop 125 may be turned off. The ability to turn off low-temperature VCS loop 121 and high-temperature VCS loop 125 may be enabled by all of the thermal loads, including the primary thermal load 102 and secondary thermal load 120, first being absorbed in the TES medium. The ability to turn off low-temperature VCS loop 121 and high-temperature VCS loop 125 may conserve system power and provide cooling quickly, without needing to wait for low-temperature VCS loop 121 and high-temperature VCS loop 125 to begin providing cooling. The ability to turn off low-temperature VCS loop 121 and high-temperature VCS loop 125 may also limit system vibration and acoustic emissions.

Thermal management system 100, as illustrated in FIG. 1, may be an advantageous example of a thermal management system according to the present disclosure if the pressure drop around TPP loop 110 is sufficiently low such that the temperature of the primary fluid in TPPL accumulator 104 may be sufficiently warm for primary thermal load 102. To provide an additional small amount of preheating to the primary fluid, TPP loop 110 may include restriction 108 downstream of TPPL liquid pump 106, which may require TPPL liquid pump 106 to add more power to TPP loop 110, which may provide some heating. The speed of TPPL liquid pump 106 and restriction 108 may be adjusted so as to provide an advantageous flow rate and an advantageous amount of preheating to the primary fluid.

Further, positioning secondary thermal load 120 downstream of TPPL condenser 112, as illustrated in FIG. 1, may be advantageous if, as in some examples, secondary thermal load 120 may operate at a higher temperature than primary thermal load 102, which may increase the efficiency of main TES loop 115 by heating the TES medium to a higher temperature. Secondary thermal load 120 thereby may be rejected to all or some of the TES medium. In other examples, secondary thermal load 120 may be additionally disposed on a second TPPL that is cooled by the TES medium.

Figure 2:
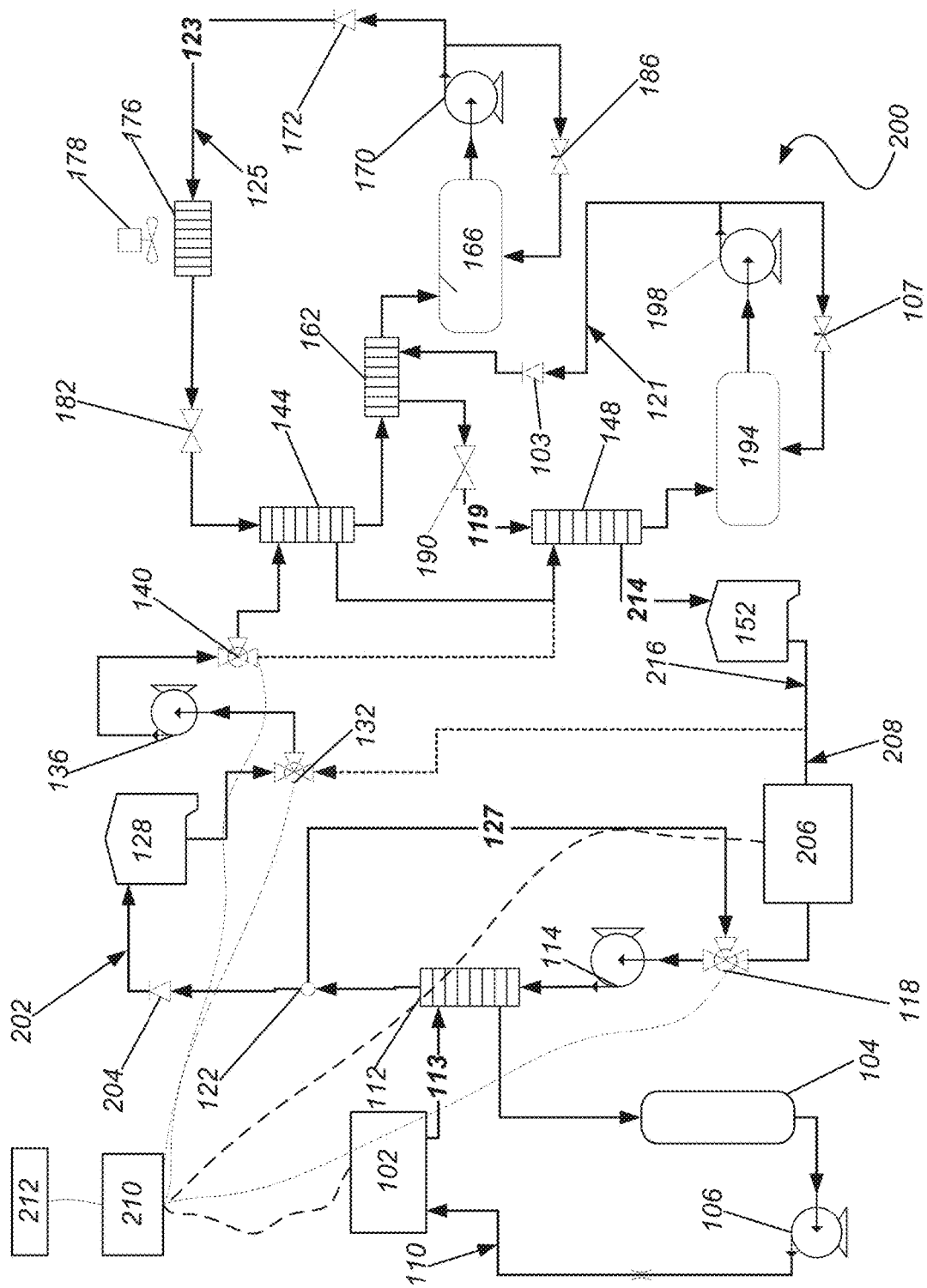
FIG. 2 illustrates a schematic of another example of a TMS configured to cool two or more thermal loads, in which the secondary thermal load is upstream of a two-phase pump loop ("TPPL") condenser and a TPPL condenser pump.

FIG. 2 illustrates a schematic of another example of a thermal management system 200 to cool transient heat loads, in which secondary thermal load 206 is upstream of TPPL condenser 112 and TPPL condenser pump 114 in main TES loop 216 on TES medium flow path 214. Thermal management system 200 includes many of the same components performing the same functions as those described herein elsewhere. Primary differences between thermal management system 100 illustrated in FIG. 1 and thermal management system 200 illustrated in FIG. 2 include: secondary thermal load 206 disposed on low-temperature-tank-outlet conduit 208 upstream of mix valve 118 and condenser pump recirculation loop 127 in main TES loop 216. Additionally, conduit-junction-warm-temperature-tank conduit 202 may be disposed between conduit junction 122 and warm-temperature tank 128, and in fluid-communication with, and/or coupled to, warm-temperature tank inlet. Valve 204 may be a check valve with a cracking pressure or a back-pressure regulator, or other suitable means for supporting a condenser pump recirculation loop.

Thermal management system 200 may further include processor 210, which may be in communication with memory 212. In the example of a thermal management system 200 illustrated in FIG. 2, processor 210 is configured to control mix valve 118, first three-way valve 132, and/or second three-way valve 140 to advantageously adjust flow of the TES medium in main TES loop 216 as primary thermal load 102 and/or secondary thermal load 206 vary.

Figure 3:
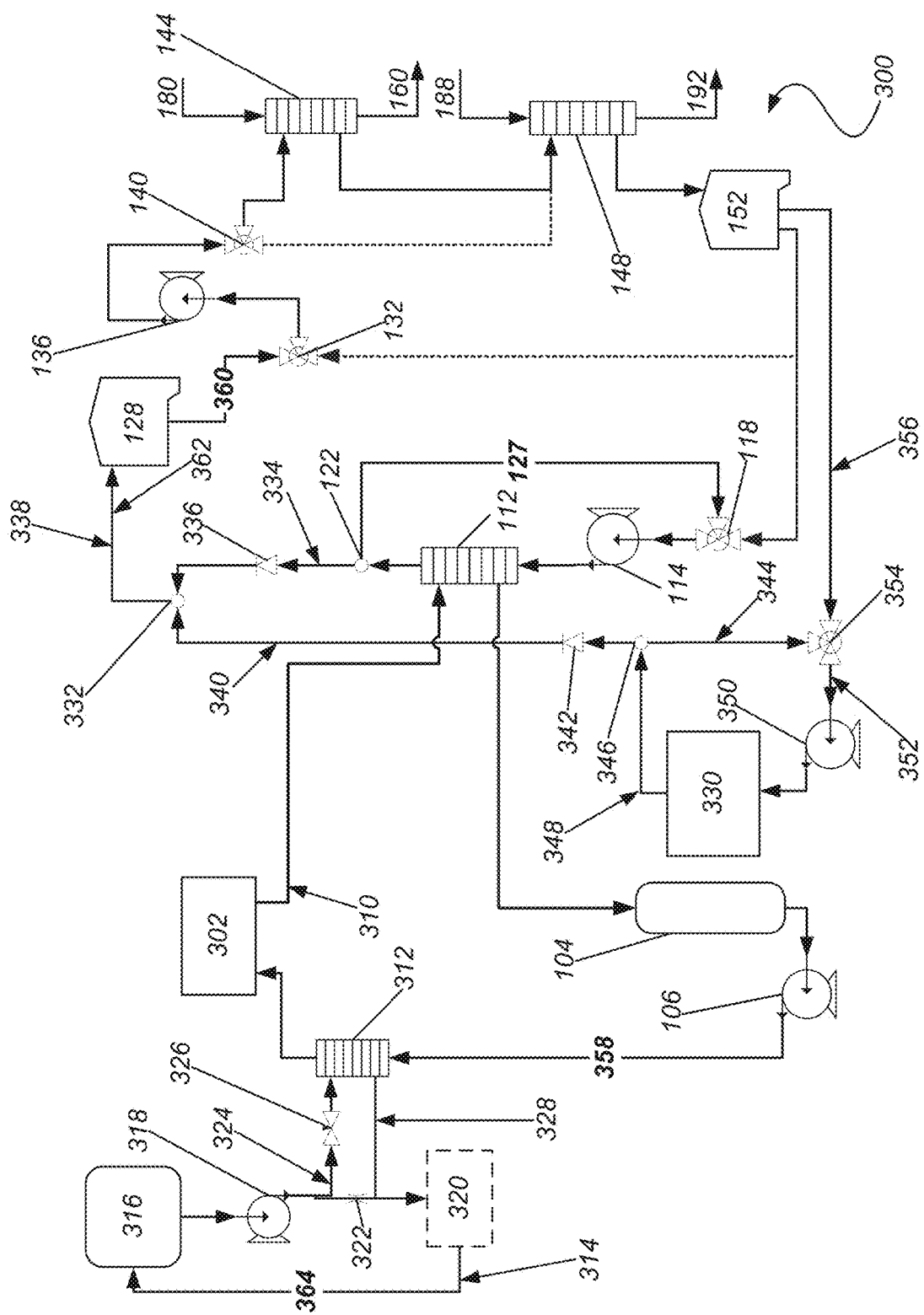
FIG. 3 illustrates a schematic of yet another example of a TMS configured to cool two or more thermal loads, in which an example of a TPPL includes a preheater heat exchanger, the preheater heat exchanger additionally disposed on a preheater thermal energy storage ("TES") loop.

FIG. 3 illustrates a schematic of yet another example of a thermal management system 300 to cool transient heat loads. Thermal management system 300 includes many of the same components performing the same functions as those described herein elsewhere. Primary differences between thermal management system 100 illustrated in FIG. 1 and thermal management system 200 illustrated in FIG. 2 compared to thermal management system 300 include: secondary thermal load 330 disposed in parallel to condenser pump recirculation loop 127, rather than upstream of condenser pump recirculation loop 127 as in thermal management system 200 or downstream of condenser pump recirculation loop 127 as in thermal management system 100; and TPP loop 310 includes a preheater heat exchanger 312 in primary fluid flow path 358, preheater heat exchanger 312 disposed on preheater TES loop 314 with preheater fluid flow path 364.

TPP loop 310 may further include preheater heat exchanger 312 downstream of TPPL liquid pump 106 and upstream of primary thermal load 302. Preheater heat exchanger 312 may include a first preheater inlet, a second preheater inlet, a first preheater outlet, and a second preheater outlet. TPPL liquid pump outlet may be in fluid communication with, and/or coupled to, first preheater inlet. First preheater outlet may be in fluid communication with primary thermal load 302 disposed on TPP loop 310 downstream of first preheater outlet and upstream of liquid-vapor separator inlet.

Primary fluid flowing through primary thermal load 302 may be advantageously maintained at substantially constant temperature at all times, which may necessitate a heat load requirement in preheater heat exchanger 312, if there is a large pressure drop between primary thermal load 302 and TPPL accumulator 104. When primary thermal load 302 increases to large levels, the flow rate of primary fluid may increase significantly in the TPP loop 310. When this occurs, the heat load requirements increase in preheater heat exchanger 312. In some systems, the preheating is done by using compressor discharge to heat the TPP loop 310. However, to maintain the ability to cool primary thermal load 302 and secondary thermal load 330 without low-temperature VCS compressor 198 and high-temperature VCS compressor 170 running for a period of time, it is desirable to have an alternative heat source during the period in time when low-temperature VCS compressor 198 and high-temperature VCS compressor 170 are not operating. An electric heater may provide heat to preheater heat exchanger 312, but such an electrical heater could result in large instantaneous peak electrical loads. To limit peak system power requirements for a large transient heat load in preheater heat exchanger 312, it is desirable to use thermal energy storage (TES). The preheater TES loop 314 enables a peak reduction in instantaneous external power for preheater heat exchanger 312.

Preheater TES loop 314 may include preheater heat exchanger 312, preheater tank 316, and preheater pump 318. Preheater fluid flow path 364 may be arranged such that each subsequent component, as listed in the order above, may be located downstream of the prior components, and the effluent of preheater pump 318 ultimately being returned to preheater heat exchanger 312 after flowing around preheater TES loop 314. Preheater TES loop 314 may include preheater fluid disposed in preheater TES loop 314. Preheater fluid may be a water-based coolant, for example. In some examples, preheater TES loop 314 may further include heater 320. Conduits of preheater TES loop 314 may be insulated.

Preheater tank 316 may be insulated and may include a preheater tank inlet and a preheater tank outlet. Preheater pump 318 may include a preheater pump inlet and a preheater pump outlet. Heater 320 may include a heater inlet and a heater outlet. Preheater tank outlet may be in fluid communication with, and/or coupled to, preheater pump inlet. Preheater pump outlet may be in fluid communication with, and/or coupled to, heater inlet. Heater outlet may be in fluid communication with, and/or coupled to, preheater tank inlet.

During operation, as preheater fluid is pumped by preheater pump 318, preheater fluid may be heated. The volume of heated preheater fluid is stored in preheater tank 316. A flow restriction 322 may be disposed in preheater TES loop 314 downstream of preheater pump 318 and upstream of heater 320. Flow restriction 322 may increase pump work to increase the amount of heat that preheater pump 318 may add to the preheater fluid. Alternatively, flow restriction 322 may be a valve that may be adjusted to restrict flow. Heater 320 may add additional heat to the preheater fluid beyond what heat may be generated by preheater pump 318. Examples of heat sources for heater 320 may include an electric heater, hot gas heating from low-temperature VCS compressor 198 exit or high-temperature VCS compressor 170 exit, and waste heat from other components that may be on the overall platform. Preheater TES loop 314 may include preheater-heat-exchanger-loop conduit 328 disposed between preheater heat exchanger 312 and preheater TES loop 314. Preheater-heat-exchanger-loop conduit 328 may be in fluid communication with, and/or coupled to, each of second preheater outlet and preheater TES loop 314. Preheater TES loop 314 may also include loop-preheater-heat-exchanger conduit 324 disposed between preheater heat exchanger 312 and preheater TES loop 314. Loop-preheater-heat-exchanger conduit 324 may be in fluid communication with, and/or coupled to, each of second preheater inlet and preheater TES loop 314. Preheater flow control valve 326 may be disposed on loop-preheater-heat-exchanger conduit 324 and may manage the heating in preheater heat exchanger 312 by controlling the amount of preheater fluid sent to preheater heat exchanger 312. Preheater flow control valve 326 may be open, partially open, or closed as is advantageous. Preheater TES loop 314 may advantageously provide preheating without requiring that low-temperature VCS compressor 198 or high-temperature VCS compressor 170 be running. Accordingly preheater TES loop 314 may be thermally coupled to TPP loop 310 by preheater heat exchanger 312. Each of flow restriction 322 and preheater flow control valve 326 may alternatively represent one or more separate valves and components configured to perform operations identical to, respectively, each of flow restriction 322 and preheater flow control valve 326.

Preheater TES loop 314 may include additional components and/or conduits, some of which are described herein. Preheater fluid flow path 364 may form a closed fluid flow path, meaning that thermal management system 300 is designed such that the preheater fluid does not intentionally enter or leave preheater TES loop 314 during operation. Being characterized as "closed" does not prohibit, however, preheater fluid from being added to or removed from preheater TES loop 314 to make up for leaks, change of the preheater fluid after preheater fluid degradation, or for some other maintenance or repair procedure.

FIG. 3 additionally illustrates main TES loop 362 with TES medium flow path 360 that may include differences from main TES loop 115 illustrated in FIG. 1 and main TES loop 216 illustrated in FIG. 2. In thermal management system 300, main TES loop 362 may include conduit junction 332 downstream of conduit junction 122. Conduit-junction conduit 334 may be disposed between conduit junction 332 and conduit junction 122. Conduit-junction conduit 334 may include valve 336 disposed on conduit-junction conduit 334. Valve 336 may be a check valve with a cracking pressure, or a back-pressure regulator. Conduit-junction-warm-temperature-tank conduit 338 may be disposed between conduit junction 332 and warm-temperature tank 128.

Main TES loop 362 may include secondary thermal load 330 in parallel to condenser pump recirculation loop 127. Mix valve 354 may be disposed downstream of cold-temperature tank 152. Cold-temperature tank 152 may include second cold-temperature tank outlet. Second-cold-temperature-tank-outlet conduit 356 may be in fluid communication with, and/or coupled to, each of second cold-temperature tank outlet and mix valve 354. Secondary pump 350 may be downstream of mix valve 354. Secondary pump 350 may include secondary pump inlet and secondary pump outlet. Secondary pump inlet may be in fluid communication with, and/or coupled to, mix valve 354 by mix-valve-secondary-pump conduit 352. Secondary pump 350 may raise the pressure of the TES medium and may provide workflow to move the TES medium to the secondary thermal load 330 within main TES loop 362. Alternatively, cold-temperature tank 152 may include only one tank outlet and may be in fluid communication with a conduit junction or valve that is in fluid communication with mix valve 118 and mix valve 354. Mix valve 354 may alternatively represent one or more separate valves and components configured to perform operations identical to mix valve 354.

Secondary thermal load 330 may be downstream of the secondary pump outlet and upstream of conduit junction 346, disposed on secondary-pump-conduit-junction conduit 348. Secondary thermal load 330 may receive the TES medium from secondary pump 350. Accordingly, secondary thermal load receives the cold-temperature TES medium from cold-temperature tank 152 via second-cold-temperature-tank-outlet conduit 356, mix valve 354, and secondary pump 350. Mix valve 354 is configured to control the temperature of TES medium to cool secondary thermal load 330 by providing an appropriate amount of flow of TES medium from cold-temperature tank 152 and effluent from secondary thermal load 330. At conduit junction 346, the TES medium, which has absorbed heat from secondary thermal load 330, may return to mix valve 354 via conduit-junction-mix-valve conduit 344, and mix with the cold-temperature TES medium flowing from cold-temperature tank 152 before flowing again to secondary pump 350 and secondary thermal load 330. Also at conduit junction 346, the TES medium, which has absorbed heat from secondary thermal load 330, may flow to conduit junction 332 via second-conduit-junction conduit 340 and subsequently to warm-temperature tank 128 via conduit-junction-warm-temperature-tank conduit 338. Valve 342 may be disposed on second-conduit-junction conduit 340. Valve 342 may be a check valve with a cracking pressure, or a back-pressure regulator.

Figure 4:
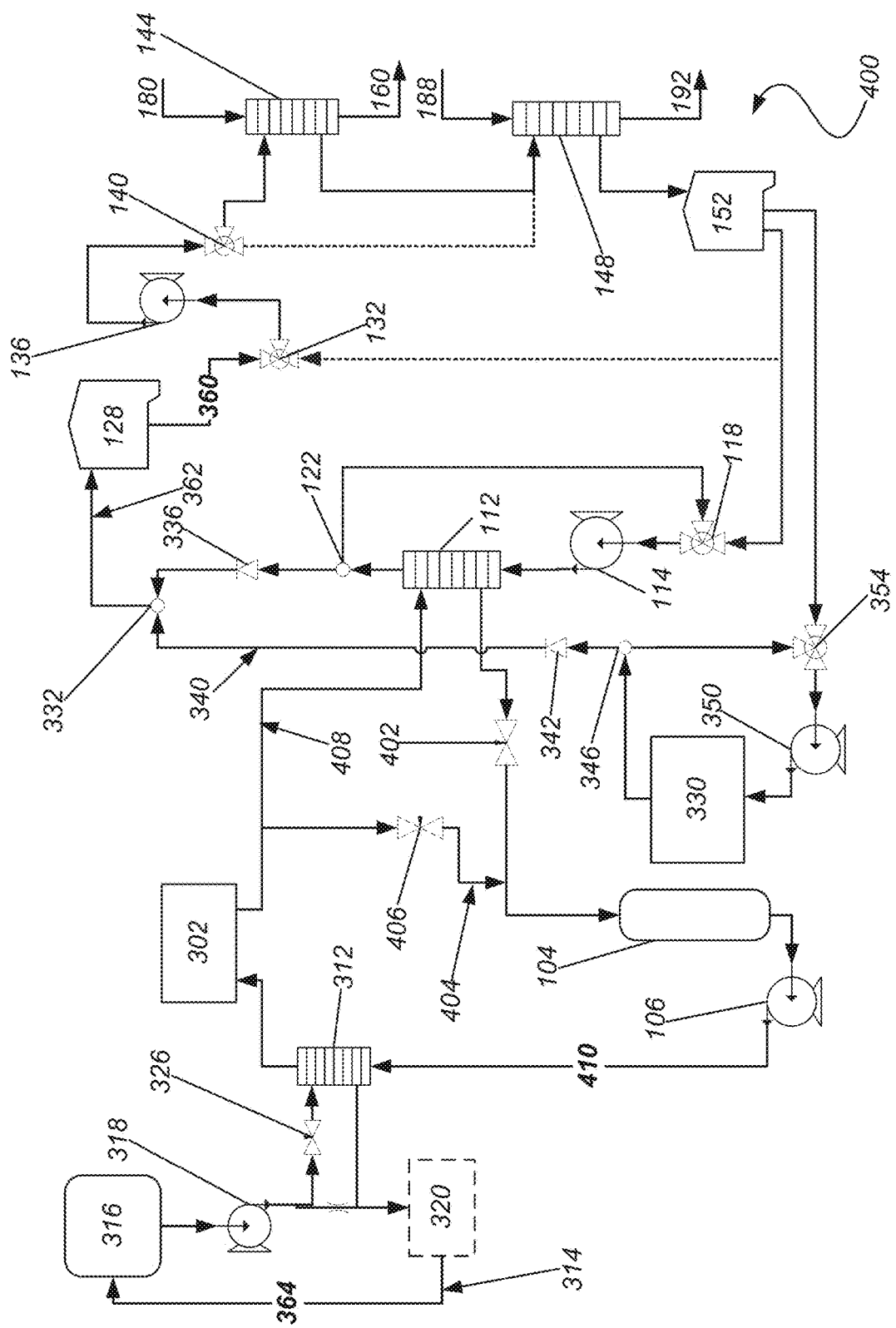
FIG. 4 illustrates a schematic of yet another example of a TMS configured to cool two or more thermal loads, in which the TPPL further includes a conduit bypassing the TPPL condenser with a valve disposed on the conduit.

FIG. 4 illustrates a schematic of yet another example of a thermal management system 400 to cool transient heat loads, in which TPP loop 408 as illustrated in FIG. 4 further includes bypass conduit 404 in primary fluid flow path 410 bypassing TPPL condenser 112.

Bypass conduit 404 may be in fluid communication with TPP loop 408 downstream of primary thermal load 302 and upstream of TPPL condenser 112, and upstream of TPPL accumulator 104 and downstream of TPPL condenser 112. The primary fluid may flow to TPPL condenser 112 to be condensed into a liquid-phase primary fluid, which may be mixed with the primary fluid flowing through bypass conduit 404 and the primary fluid may be subsequently stored in TPPL accumulator 104. The liquid-phase primary fluid that was stored in TPPL accumulator 104 may need to be preheated.

As heat increases in primary thermal load 302, the rate of vapor-phase primary fluid production may increase. Flow control valve 406 may be disposed on bypass conduit 404 to control the flow of the primary fluid to TPPL accumulator 104. If the pressure in TPPL accumulator 104 increases to a value higher than desired, flow control valve 406 may be incrementally closed to increase flow through TPPL condenser 112, and hence increase cooling of the primary fluid. If the pressure in TPPL accumulator 104 decreases to a value lower than desired, flow control valve 406 may be incrementally opened, thus reducing flow of the primary fluid through TPPL condenser 112, and hence reducing the amount of heat being removed from the primary fluid. Flow control valve 406 may be open, partially open, or closed so as to advantageously control flow of the primary fluid through bypass conduit 404. By opening flow control valve 406, response time of TPP loop 408 to primary thermal load 302 may be improved relative to the example of thermal management system 200 in FIG. 2. Flow control valve 402 may be disposed downstream of TPPL condenser 112 and upstream of bypass conduit 404. Flow control valve 402 may be open, partially open, or closed so as to advantageously control flow of primary fluid from TPPL condenser 112. Flow control valve 402 may be set to a fixed position during operation. Flow control valve 402 may be a fixed flow restriction.

Figure 5:
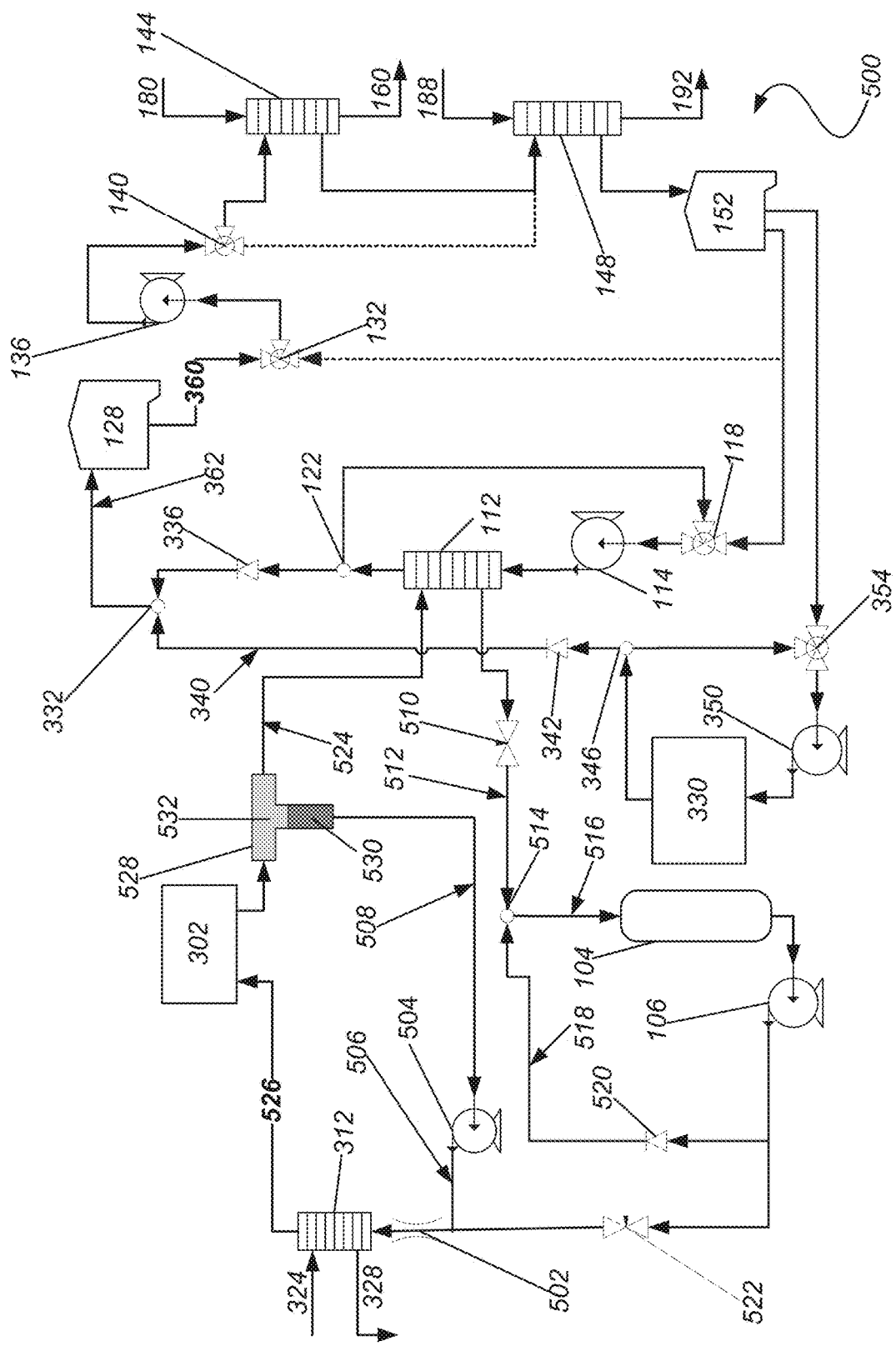
FIG. 5 illustrates a schematic of yet another example of a TMS configured to cool two or more loads, in which the TPPL further includes a liquid/vapor separator and a TPPL recirculation pump.

FIG. 5 illustrates a schematic of yet another example of a thermal management system 500 to cool transient heat loads, in which TPP loop 524 as illustrated in FIG. 5 further includes a recirculation pump 504 in primary fluid flow path 526. Recirculation pump 504 may include a recirculation pump inlet and recirculation pump outlet. Recirculation pump 504 may raise the pressure of the primary fluid and may provide workflow to move the primary fluid downstream within TPP loop 310.

Liquid-vapor separator 528 may include a liquid-vapor separator inlet, a liquid-vapor separator outlet, and a second liquid-vapor separator outlet. Liquid-vapor separator 528 may further include any device configured to separate a liquid-vapor mixture of primary fluid into a volume of liquid-phase primary fluid 530 and a volume of vapor-phase primary fluid 532. Liquid-vapor separator 528 may be a vessel in which gravity causes volume of liquid-phase primary fluid 530 to settle to a bottom portion of the vessel and volume of vapor-phase primary fluid 532 to rise to a top portion of the vessel. Alternatively, liquid-vapor separator 528 may use centrifugal force to drive volume of liquid-phase primary fluid 530 towards an outer edge of the vessel for removal and volume of vapor-phase primary fluid 532 may migrate towards a center region of the vessel. In some examples, liquid-vapor separator 528 may include a level sensor mechanism or one or more volume set point sensors that monitor a level of volume of liquid-phase primary fluid 530 in the vessel. In other examples, liquid-vapor separator 528 may include volume to store volume of liquid-phase primary fluid 530.

Liquid-vapor separator 528 may be disposed on TPP loop 524 downstream of primary thermal load 302 and upstream of the first TPPL condenser inlet to TPPL condenser 112. The liquid-vapor separator outlet may be in fluid communication with, and/or coupled to, the first TPPL condenser inlet.

Recirculation conduit 508 is disposed between the second liquid-vapor separator outlet and the recirculation pump inlet, and may be in fluid communication with, and/or coupled to, each of the second liquid-vapor separator outlet and the recirculation pump inlet. Recirculation-pump-outlet conduit 506 is disposed between the recirculation pump outlet and TPP loop 524 and may be in fluid communication with, and/or coupled to, each of the recirculation pump outlet and TPP loop 524. TPP loop 524 may further include restriction 502 downstream of recirculation-pump-outlet conduit 506 and upstream of preheater heat exchanger 312.

Thermal management system 500 may further include a TPPL liquid pump loop in TPP loop 524. Conduit junction 514 may be disposed upstream of TPPL accumulator 104. Conduit-junction-TPPL-accumulator conduit 516 may be disposed between conduit junction 514 and TPPL accumulator inlet, and may be in fluid communication with, and/or coupled to, each of conduit junction 514 and TPPL accumulator inlet. TPPL-condenser-junction conduit 512 may be disposed between first TPPL condenser outlet and conduit junction 514 and may be in fluid communication with, and/or coupled to, each of first TPPL condenser outlet and conduit junction 514. TPPL-junction conduit 518 may be disposed between TPP loop 524, downstream of TPPL liquid pump 106 and upstream of recirculation-pump-outlet conduit 506, and conduit junction 514, and may be in fluid communication with, and/or coupled to, each of TPP loop 524 and conduit junction 514.

Flow control valve 522 may be disposed on TPP loop 524 downstream of TPPL-junction conduit 518 and upstream of recirculation-pump-outlet conduit 506. Back-pressure regulator 510 may be disposed on TPPL-condenser-junction conduit 512. Valve 520 may be disposed on TPPL-junction conduit 518. Valve 520 may be a check valve with a cracking pressure, or a back-pressure regulator.

When there is no heat load in primary thermal load 302, no vapor-phase primary fluid will exit primary thermal load 302, and the liquid-phase primary fluid may continue to be circulated with a minimal need to preheat the liquid-phase primary fluid or use the liquid-phase primary fluid stored in TPPL accumulator 104. When primary thermal load 302 is a low thermal load, TPPL liquid pump 106 may be turned off for a period of time, and the liquid-phase primary fluid reserves in liquid-vapor separator 528 may be used. As the liquid-phase primary fluid level drops and the liquid-phase primary fluid reaches its lower set point, the liquid-phase primary fluid may be replenished by turning on TPPL liquid pump 106.

During operation of thermal management system 500, the volume of liquid-phase primary fluid may be monitored relative to a lower and/or a higher set point, and flow of the liquid-phase primary fluid through recirculation conduit 508 and recirculation pump 504 may be varied. Further, flow of the liquid-phase primary fluid from TPPL accumulator 104 and TPPL liquid pump 106 may be varied, such that the required combined total flow rate of the liquid-phase primary fluid from each of recirculation conduit 508 and TPPL accumulator 104 through primary thermal load 302 may be maintained at some required flow rate. Accordingly, in an example, combined total flow rate of the liquid-phase primary fluid may be maintained by flow control valve 522, which may be open, partially open, or closed, so as to advantageously control flow rate of the liquid-phase primary fluid from TPPL accumulator 104 and TPPL liquid pump 106. The liquid-phase primary fluid may circulate through TPPL liquid pump 106 and back to TPPL accumulator 104 through TPPL-junction conduit 518 and conduit-junction-TPPL-accumulator conduit 516.

An example of a method of transferring heat from primary thermal load 102 and secondary thermal load 120 to the ambient environment may include the steps of: transferring heat from primary thermal load 102 to TPPL condenser 112; transferring heat from TPPL condenser 112 to a TES medium disposed in main TES loop 115 including TPPL condenser pump 114, TPPL condenser 112, warm-temperature tank 128, high-temperature evaporator 144, low-temperature evaporator 148, and cold-temperature tank 152; transferring heat from secondary thermal load 120 in main TES loop 115 to the TES medium; transferring heat from the TES medium to a VCS fluid disposed in a VCS loop via high-temperature evaporator 144 and low-temperature evaporator 148; transferring heat from the VCS loop to the ambient environment via high-temperature VCS condenser 176 in the VCS loop; and accumulating the TES medium to a predetermined volume set point in cold-temperature tank 152 at a temperature at least a predetermined temperature difference lower than the temperature of the TES medium in warm-temperature tank 128.

Another example of a method of transferring heat may further include the step of, after the accumulating: turning off high-temperature VCS compressor 170 and/or low-temperature VCS compressor 198 until a temperature difference between the temperature of the TES medium in warm-temperature tank 128 and the TES medium in cold-temperature tank 152 is less than the predetermined temperature difference and/or until primary thermal load 102 increases.

Another example of a method of transferring heat may further include the step of: decreasing the flow rate through TPPL condenser pump 114 when primary thermal load 102 decreases.

Another example of a method of transferring heat may further include the step of: increasing flow of the TES medium from cold-temperature tank 152 through mix valve 118 to a pump recirculation loop when primary thermal load 102 increases, the pump recirculation loop including TPPL condenser pump 114, TPPL condenser 112, mix valve 118, and conduit-junction-mix-valve conduit 116 in fluid communication with TPPL condenser 112 and mix valve 118.

Another example of a method of transferring heat may further include the step of: setting first three-way valve 132 to bypass, at least partially, TPPL condenser 112 and secondary thermal load 120 when the temperature of the TES medium in cold-temperature tank 152 increases to a predetermined temperature set point.

Another example of a method of transferring heat may further include the step of: setting second three-way valve 140 to bypass, at least partially, the high-temperature evaporator 144 when the TES medium entering second three-way valve 140 has a temperature at or lower than a second predetermined temperature set point.

Examples of the thermal management systems of the present disclosure may additionally include memory 212 and processor 210. Processor 210 may be in communication with memory 212 and a network interface (network interface not shown in FIGS. 1 through 8). In one example, processor 210 may also be in communication with additional elements, such as a display (display not shown in FIGS. 1 through 8). Examples of processor 210 may include a controller, a general processor, a central processing unit, a microcontroller, a server, an application specific integrated circuit ("ASIC"), a digital signal processor, a field programmable gate array ("FPGA"), a digital circuit, and/or an analog circuit.

Processor 210 may be one or more devices operable to execute logic. The logic may include computer executable instructions or computer code embodied in memory 212 or in other memory that, when executed by processor 210, may cause processor 210 to perform the features implemented by the logic. The computer code may include instructions executable with processor 210.

The processing capability of thermal management systems of the present disclosure may be distributed among multiple entities, such as among multiple processors and memories, optionally including multiple distributed processing systems. Processor 210 and memory 212 may be distributed such that processor 210 and memory 212 are independent of one another.

Processor 210 may advantageously control each of mix valves 118, 354, first three-way valve 132, second three-way valve 140, first flow control valve 107, second flow control valve 186, preheater flow control valve 326, flow control valves 402, 406, 522, back-pressure regulator 510, first expansion valve 190, second expansion valve 182, valves 103, 126, 172, 204, 336, 342, 520, and restrictions 322, 502, to separately position such valves and/or restrictions open, partially open, or closed as necessary, desirable, or preferable to a particular operation of a thermal management system of the present disclosure and/or detect an indication, such as an indication of a temperature, at one or more sensors or set points. Processor 210 may advantageously control each of TPPL liquid pump 106, recharge pump 136, TPPL condenser pump 114, low-temperature VCS compressor 198, high-temperature VCS compressor 170, preheater pump 318, secondary pump 350, recirculation pump 504, low-pressure compressor 706, and/or high-pressure compressor 704 to switch any pump or compressor on or off, and/or increase or decrease speed and/or power to any pump or compressor. Processor 210 may advantageously control and/or monitor one or more set points and/or detect an indication, such as an indication of a volume or a temperature or a pressure or an actual or anticipated thermal load increase or decrease via one or more sensors, in each of TPPL accumulator 104, low-temperature VCS accumulator 194, high-temperature VCS accumulator 166, cold-temperature tank 152, warm-temperature tank 128, high-temperature evaporator 144, low-temperature evaporator 148, low-temperature VCS condenser, low-temperature VCS condenser 162, high-temperature VCS condenser 176, preheater tank 316, and liquid-vapor separator 528 to advantageously implement various pre-determined routines.

Figure 6:
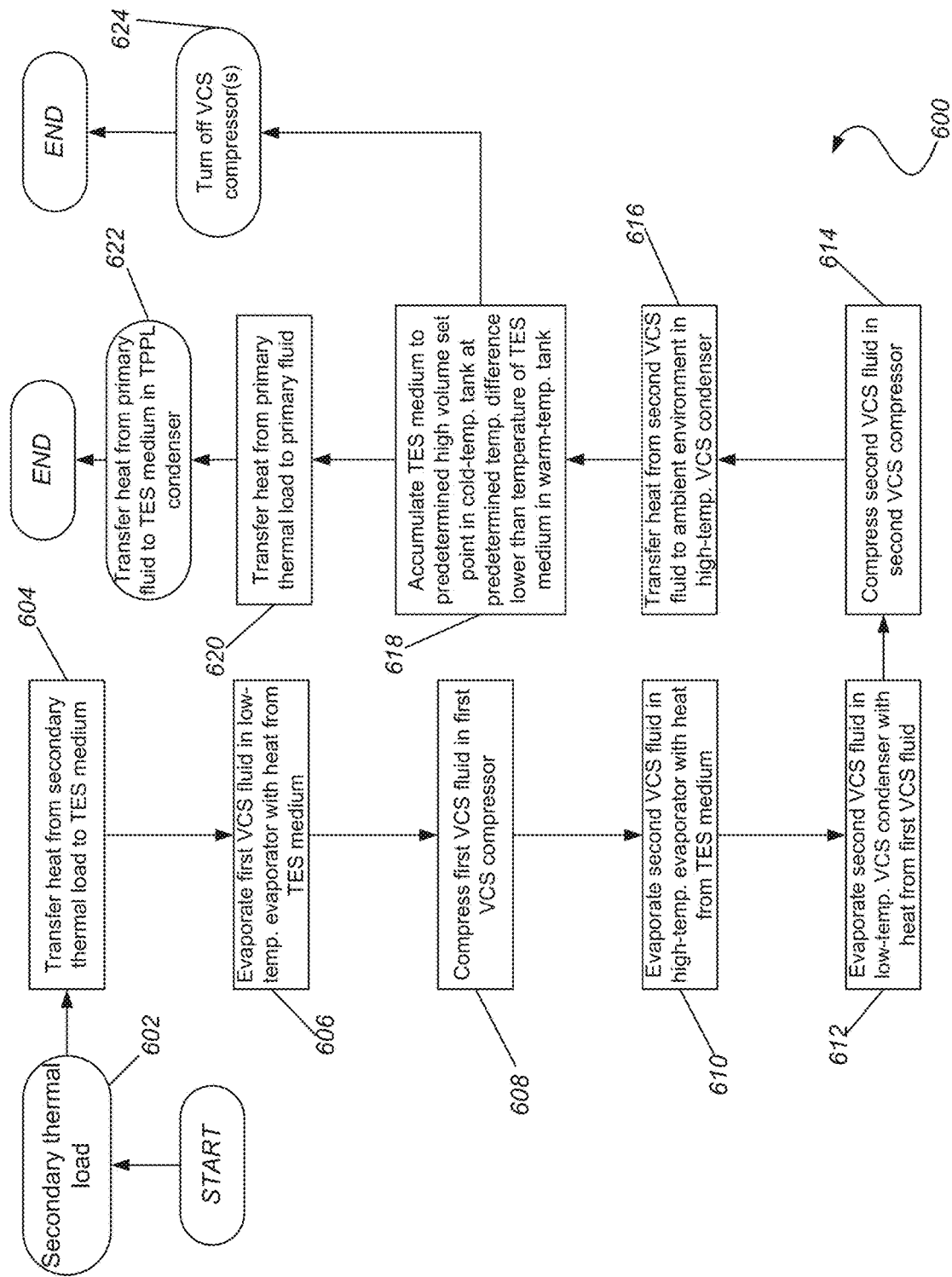
FIG. 6 illustrates an example of a flow diagram of operations of a thermal management system configured to cool a transient heat load.

FIG. 6 illustrates an example of flow diagram 600 of operations of an example of a thermal management system. Flow diagram 600 illustrates only one example of operations of an example of a thermal management system. The operations may include more, less, or different steps than illustrated by flow diagram 600, and may become more complex than flow diagram 600. Start 602 of flow diagram 600 is at secondary thermal load 120. Processes 604, 606, 608, 610, 612, 614, 616, 618, and 620 may be performed in any sequence, and all or some of processes 604, 606, 608, 610, 612, 614, 616, 618, and 620 may be performed simultaneously. Process 604 is to transfer heat from secondary thermal load 120 to the TES medium. Process 606 is to evaporate the low-temperature VCS fluid in low-temperature evaporator 148 with heat from the TES medium. Process 608 is to compress the low-temperature VCS fluid in low-temperature VCS compressor 198. Process 610 is to evaporate the high-temperature VCS fluid in high-temperature evaporator 144 with heat from the TES medium. Process 612 is to evaporate the high-temperature VCS fluid in low-temperature VCS condenser 162 with heat from the low-temperature VCS fluid. Process 614 is to compress the high-temperature VCS fluid in high-temperature VCS compressor 170. Process 616 is to transfer heat from the high-temperature VCS fluid to the ambient environment in high-temperature VCS condenser 176. Process 618 is to accumulate the TES medium to a predetermined volume set point in cold-temperature tank 152 at a temperature at least a predetermined temperature difference lower than the temperature of the TES medium in warm-temperature tank 128. Subsequent to process 618, operations may end 624 by turning off low-temperature VCS compressor 198 and high-temperature VCS compressor 170. Alternatively, or in addition, operations may proceed to process 620. Process 620 is to transfer heat from primary thermal load 102 to the primary fluid. After transferring heat from primary thermal load 102 to the primary fluid, operations may, for example, end 622. End 622 may be to transfer heat from the primary fluid to the TES medium in TPPL condenser 112, at which point operations may end, for example. Alternatively, or in addition, when the TES medium is no longer accumulated to at least the predetermined volume set point in cold-temperature tank 152, and/or primary thermal load 102 increases, low-temperature VCS compressor 198 and high-temperature VCS compressor 170 may be restarted. Alternatively, or in addition, while accumulating TES medium in cold-temperature tank 152, preheater tank 316 may be heated by running preheater pump 318 and optionally heater 320.

Figure 7:
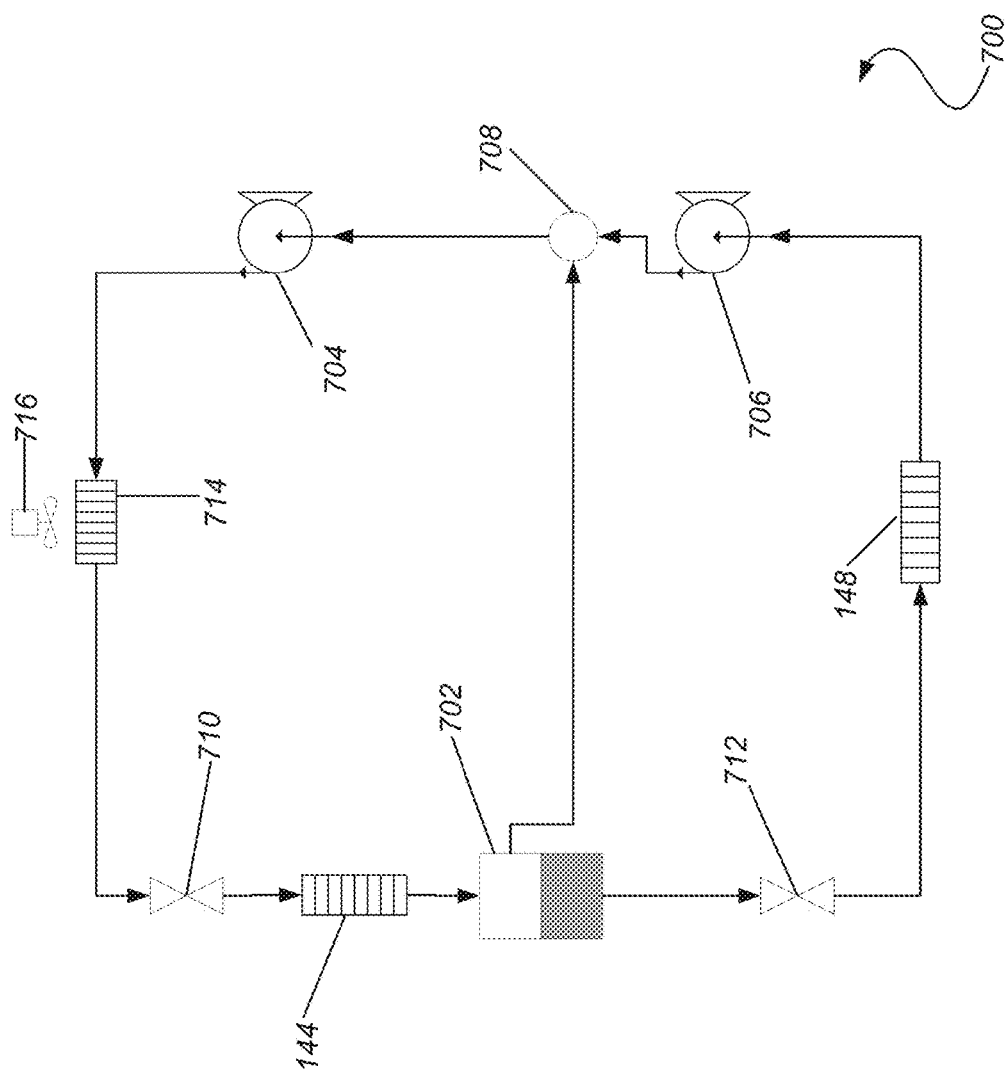
FIG. 7 illustrates an example of a multi-stage compression system loop that may be implemented in an example of a TMS configured to cool two or more loads.

FIG. 7 illustrates an example of a multi-stage compression system ("MCS") loop 700 that may be one example of a vapor compression system loop in thermal management systems of the present disclosure. MCS loop 700 includes low-temperature evaporator 148 and high-temperature evaporator 144 by which MCS loop 700 is thermally coupled to main TES loop 115, for example. MCS loop 700 further includes high-temperature VCS condenser 714, which may be also referred to as a "VCS condenser," by which MCS loop 700 is thermally coupled to an ambient environment. VCS condenser 714 may include a forced ventilation unit, such as fan 716. MCS loop 700 further includes flash chamber 702, a high-pressure compressor 704, a low-pressure compressor 706, a conduit junction 708, a first expansion valve 710, and a second expansion valve 712. MCS loop 700 may include a high-temperature VCS fluid or a low-temperature VCS fluid as defined herein, also referred to as a "VCS fluid."

Flash chamber 702 may be any tank configured to separate the vapor-phase VCS fluid from the liquid-phase VCS fluid.

Examples of first expansion valve 710 may include a thermal expansion valve and an electronic expansion valve. Examples of second expansion valve 712 may include a thermal expansion valve and an electronic expansion valve.

Low-pressure compressor 706 may be configured to raise pressure of the VCS fluid flowing through second expansion valve 712 and low-temperature evaporator 148, which may be referred to as a "first stage" of compression. High-pressure compressor 704 may be configured to raise pressure of the VCS fluid that is combined from: the VCS fluid flowing from an outlet of high-temperature evaporator 144 to flash chamber 702, and then to conduit junction 708; and the VCS fluid exiting low-pressure compressor 706 through an outlet of low-temperature VCS compressor 198. High-pressure compressor 704 may perform a "second stage" of compression. Alternatively, low-pressure compressor 706 and high-pressure compressor 704 may together represent a multi-stage compressor.

Conduit junction 708 may be a joint in conduits, or a tee in the conduit, or a mix valve. Conduit junction 708 is configured to combine the VCS fluid from flash chamber 702 with the VCS fluid from low-pressure compressor 706.

During operation, the VCS fluid may flow from flash chamber 702 through second expansion valve 712 configured to expand the VCS fluid. The VCS fluid then flows through the cold-side channels of low-temperature evaporator 148 configured to transfer heat from the TES medium to the VCS fluid, and through low-pressure compressor 706 configured to raise the pressure, and consequently temperature, of the VCS fluid. The higher-pressure VCS fluid flowing from low-pressure compressor 706 or the first stage of compression may combine with VCS fluid from flash chamber 702 at conduit junction 708. High-temperature evaporator 144 is configured to transfer heat from the TES medium to the VCS fluid. The combined VCS fluid then flows through high-pressure compressor 704 configured to further raise pressure, and consequently temperature, of the VCS fluid. The VCS fluid then flows to VCS condenser 714 configured to transfer heat from the VCS fluid to the ambient environment. The VCS fluid then flows through first expansion valve 710 configured to expand the VCS fluid, which then flows back to high-temperature evaporator 144 and flash chamber 702.

Processor 210 may be configured to cease compression of VCS fluid by low-pressure compressor 706 and high-pressure compressor 704, or a multi-stage compressor, at least temporarily, based on certain operational conditions in main TES loop 115, including, but not limited to, the extent of a temperature difference between the temperature of the TES medium in warm-temperature tank 128 and cold-temperature tank 152.

A thermal management system of the present disclosure may regulate dissipation of multiple thermal loads. In some examples, the multiple thermal loads may arise during operation of an apparatus. The thermal management system of the present disclosure allows for heat dissipation or rejection of multiple thermal loads that may arise in many applications, including applications involving an apparatus operated with high energy consumption. The heat arising during the operation of such an apparatus may be transient or steady-state and transferred into the thermal management system, by any means known in the art, including, but not limited to, using a two-phase pump ("TPP") loop ("TPPL," or "TPP loop"), a fluid or fluid mixture system, or an air conditioning system in conjunction with any type of fluid, coolant, or refrigerant.

A "steady-state" heat load or thermal load, as used herein, unless stated otherwise, alone or in combination with other terms, may refer to a heat load or thermal load that dissipates a substantially constant amount of thermal energy to a thermal management system during operation of the thermal management system or during a substantial portion of the operation of the thermal management system.

For the purpose of this disclosure, the phrase "substantially constant," with respect to temperature, describes a temperature condition that is stable and exhibits minimal variation, such as within a predetermined tolerance. The predetermined tolerance may be, for example, ±5° C., ±3° C., ±1° C., ±0.5° C., ±0.2° C., or ±0.1° C. Alternatively, the predetermined tolerance may mean that the substantially constant temperature stays within a predetermined percentage of a constant temperature, such as within 1, 2, 3, or 5 percent of the constant temperature. For the purpose of this disclosure, the phrase "substantial portion" may mean at least 50 percent.

In response to a variable or high transient heat load, a thermal management system of the present disclosure may change operation. The term "transient state," as used herein, unless stated otherwise, alone or in combination with other terms, refers to a thermal management system of the present disclosure operating in response to a variable or high transient or transient heat load or thermal load. A "variable" or "high transient" or "transient" heat load or thermal load, as used herein, unless stated otherwise, alone or in combination with other terms, refers to a load that temporarily increases in thermal power as a function of time, relative to a more common low power load. The term "low power load" may be a steady state load of any power level that is lower than a peak of the transient heat load. In various examples of a thermal management system of the present disclosure, a variable or high transient or transient heat load or thermal load may represent a load that temporarily increases in thermal power at least 10%; at least 30%; at least 50%; at least 75%; at least 100%; at least 200%; at least 400%; at least 800%; at least 1000%; at least 2000%; at least 3000%; at least 4000%; at least 5000%; at least 6000%; at least 7000%; at least 8000%; at least 9000%; at least 10000%; at least 11000%; at least 12000%; at least 13000%; at least 14000%; at least 15000% relative to a more common low power load.

The term "duty cycle," as used herein, unless stated otherwise, alone or in combination with other terms, refers to the duration of a variable or high transient or transient heat load or thermal load as a percent of the total time of a complete cycle, as represented by the percentage of a period of time, during which a thermal management system is at high power relative to the total time of the high power and low power conditions. One period of time is the duration of the total time of the high power and low power conditions. In various examples of a thermal management system of the present disclosure, a duty cycle is less than 0.01%; less than 0.1%; less than 1%; less than 2%; less than 3%; less than 4%; less than 5%; less than 10%; less than 15%; less than 20%; less than 25%; less than 30%; less than 40%; less than 50%; less than 60%; less than 70%; less than 80%; less than 90%.

The thermal loads dissipated by the thermal management system may be at different temperatures, with a thermal energy storage ("TES") and/or the temperature of the TES medium in a cold-temperature tank constrained not to exceed the minimum of these temperatures. In some examples, the thermal loads include a primary thermal load in the form of heat arising from an apparatus, and a second thermal load in the form of at least one of a housekeeping thermal load required to operate the apparatus, and/or platform thermal loads, and/or thermal loads associated with conditioning, distributing, or converting energy. The thermal loads associated with conditioning, distributing, or converting energy include, but are not limited to, thermal loads associated with power electronics, batteries, electric machines, or control systems. In other examples, a primary thermal load is at a higher temperature than a secondary thermal load. In other examples, a secondary thermal load is at a higher temperature than a primary thermal load. In further examples, a secondary thermal load is a steady-state heat load or thermal load.

The design of the thermal management systems of the present disclosure allows for control of a fluid or a fluid mixture temperature, the flow of a fluid or a fluid mixture, or both, depending upon the requirements of the application. The design also provides thermal energy storage ("TES"), such that the thermal management system may be a practical, operable, and package-able solution when an application requires the use of a TPPL to remove heat from a high-energy system and has one or more housekeeping, secondary, or steady-state loads that use a different fluid and/or are at a different temperature.

The following description is merely exemplary in nature and is in no way intended to limit the present disclosure or its application or uses. The incorporation and use of such a thermal management system in industrial and military applications include any apparatus, device, or combination of apparatuses or devices that consume or generate electricity and may benefit from cooling and/or heating are contemplated to be within the scope of the present disclosure. Several examples of such an apparatus or device includes, without limitation, solid state electronics, a light-emitting diode ("LED"), an analog circuit, a digital circuit, a computer, a server, a server farm, a data center, a hoteling circuit such as vehicle electronics, a vehicle such as an aircraft, a directed-energy weapon, a laser, a plasma weapon, a railgun, a microwave generator, a pulse-powered device, a satellite uplink, an electric motor, an electric device, or the like.

In examples of the present disclosure, the term "partially open," as used herein, unless stated otherwise, alone or in combination with other terms, may refer to any position of a valve between the position of being completely open (for example, 100% open) and completely closed (for example, 0% open). A partially open position may advantageously vary by example. A partially open position, in certain examples, may be such position such that a valve may advantageously increase or decrease pressure in fluid to a small degree, and/or advantageously increase or decrease temperature in fluid to a small degree, and/or advantageously increase or decrease fluid flow to a small degree. Such partially open positions providing specific advantageous pressure and/or temperature and/or flow conditions to fluid as necessary, desirable, or preferable may be understood by a person of ordinary skill.

The term "ambient environment" may refer to space immediately adjacent to and/or surrounding a thermal management system of the present disclosure. Alternatively, or in addition, the term "ambient environment" may refer to space outside of a thermal management system of the present disclosure that is thermally coupled to at least one component of a thermal management system of the present disclosure. Examples of an "ambient environment" may include a ram air duct or a fan bypass duct on an aircraft, or air or seawater. The term "ambient temperature" may refer to the temperature of the air or other fluid in the ambient environment.

For the purpose of this disclosure, the terms "about" and "substantially" are used herein with respect to measurable values and ranges due to expected variations known to those skilled in the art (for example, limitations and variability in measurements).

In describing elements of the present disclosure, the ordinal number terms "$1^{st}$", "$2^{nd}$" "first," "second," and the like, may be used herein. These ordinal number terms are only used to distinguish one element from another element, but do not limit the corresponding elements irrespective of the nature or order of the corresponding elements.

In describing elements of the present disclosure, the terms "upstream" and "downstream" refer to the relative direction with respect to fluid flow in a fluid pathway. For example, "upstream" refers to the direction from which the fluid flows, and "downstream" refers to the direction to which the fluid flows.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

All methods described herein can be performed in any suitable order unless otherwise indicated herein or otherwise clearly contradicted by context.

While various examples have been described, it will be apparent to those of ordinary skill in the art that many more implementations are possible. Accordingly, the examples described herein are not the only possible implementations.

The subject-matter of the disclosure may also relate, among others, to the following aspects:

A first aspect relates to a thermal management system comprising: a main thermal energy storage ("TES") loop, and a vapor compression system ("VCS") loop thermally coupled to an ambient environment; wherein the main TES loop comprises a TES medium disposed in a TES medium flow path, the TES medium flow path comprising, in a direction of TES medium flow: a heat exchanger pump, a heat exchanger, a first tank, a first evaporator, a second evaporator, and a second tank, the heat exchanger configured to transfer heat form a primary thermal load to the TES medium; wherein a secondary thermal load is disposed on the main TES loop; wherein the first evaporator and the second evaporator are configured to transfer heat from the TES medium to the VCS loop; wherein the VCS loop comprises the first evaporator, the second evaporator, a VCS condenser, and a VCS fluid disposed in the VCS loop, and the VCS loop is configured to transfer heat from the main TES loop to the ambient environment by the VCS condenser; and wherein the main TES loop and the VCS loop are configured to maintain the TES medium in the second tank at a temperature set point at least a predetermined temperature difference lower than the temperature of the TES medium in the first tank during operation of the thermal management system.

A second aspect relates to the thermal management system of aspect 1, further comprising: a two-phase pump loop ("TPPL") configured to cool the primary thermal load, the TPPL comprising a primary fluid disposed in a primary fluid flow path, the primary fluid flow path comprising, in a direction of primary fluid flow: the heat exchanger thermally coupling the TPPL to the main TES loop, a TPPL accumulator, a TPPL liquid pump, and the primary thermal load.

A third aspect relates to the thermal management system of any preceding aspect, wherein the primary fluid flow path further comprises a bypass conduit configured to bypass the heat exchanger downstream of the primary thermal load and upstream of the heat exchanger, and delivery primary fluid to an inlet of the TPPL accumulator downstream of the heat exchanger; wherein a first flow control valve is disposed on the bypass conduit and configured to cause the primary fluid to at least partially bypass the heat exchanger; and wherein a second flow control valve is disposed on the TPPL downstream of the heat exchanger and upstream of the bypass conduit, and the second flow control valve is configured to control flow of the primary fluid from the heat exchanger to the TPPL accumulator.

A fourth aspect relates to the thermal management system of aspect 2, the primary fluid flow path further comprising: a liquid-vapor separator upstream of the heat exchanger and downstream of the primary thermal load; a recirculation loop comprising the liquid-vapor separator and a recirculation pump configured to return the primary fluid from the liquid-vapor separator to the primary thermal load; a TPPL liquid pump loop comprising the TPPL accumulator, the TPPL liquid pump, and a return conduit configured to recycle the primary fluid to the TPPL accumulator; and a third flow control valve disposed downstream of the TPPL liquid pump loop and upstream of the recirculation loop and configured to maintain a flow rate of the primary fluid to the primary thermal load; wherein the liquid-vapor separator comprises a vapor outlet in fluid communication with the heat exchanger, and a liquid outlet in fluid communication with the recirculation pump; and wherein the liquid-vapor separator is configured to separate the primary fluid into a liquid-phase primary fluid and a vapor-phase primary fluid.

A fifth aspect relates to the thermal management system of aspects 2 to 4, the primary fluid flow path further comprising a preheater heat exchanger configured to transfer heat to the primary fluid, the preheater heat exchanger downstream of the TPPL liquid pump and upstream of the primary thermal load.

A sixth aspect relates to the thermal management system of aspect 5, wherein the preheater heat exchanger thermally couples the TPPL to a preheater TES loop; wherein the preheater TES loop comprises a preheater fluid disposed in a preheater fluid flow path, the preheater fluid flow path comprising, in a direction of preheater fluid flow: the preheater heat exchanger, a preheater tank, and a preheater pump; and wherein the preheater TES loop is configured to control an amount of heat transferred to the primary fluid by the preheater heat exchanger.

A seventh aspect relates to the thermal management system of any preceding aspect, wherein the main TES loop further comprises a pump recirculation loop, the pump recirculation loop comprising a heat exchanger pump, the heat exchanger, and a first mix valve; wherein the first mix valve is upstream of and in fluid communication with the heat exchanger pump, in fluid communication with the heat exchanger by a conduit junction downstream of the heat exchanger and a conduit-junction-mix-valve conduit, and downstream of and in fluid communication with the second tank; and wherein the first mix valve is configured to increase the flow of TES medium from the second tank as the primary thermal load increases.

An eighth aspect relates to the thermal management system of aspects 1 to 6, wherein the main TES loop further comprises a pump recirculation loop, the pump recirculation loop comprising a heat exchanger pump, the heat exchanger, and a first mix valve; wherein the first mix valve is upstream of and in fluid communication with the heat exchanger pump, in fluid communication with the heat exchanger by a conduit junction downstream of the heat exchanger and a conduit-junction-mix-valve conduit, and downstream of and in fluid communication with the second tank; and wherein a flow rate through the heat exchanger pump is configured to decrease as the primary thermal load decreases.

A ninth aspect relates to the thermal management system of any preceding aspect, wherein the main TES loop further comprises a first three-way valve in fluid communication with and downstream of the first tank, in fluid communication with and upstream of the first evaporator, and in fluid communication with an outlet of the second tank; and wherein the first three-way valve is configured to at least partially bypass the TPPL condenser and the secondary thermal load when the temperature of the TES medium in the second tank increases to a predetermined temperature set point.

A tenth aspect relates to the thermal management system of any preceding aspect, wherein the main TES loop further comprises a second three-way valve in fluid communication with and downstream of the first tank, in fluid communication with and upstream of the first evaporator, and in fluid communication with an inlet of the second evaporator; and wherein the second three-way valve is configured to at least partially bypass the first evaporator when the TES medium entering the second three-way valve has a temperature at or lower than a second predetermined temperature set point.

An eleventh aspect relates to the thermal management system of any preceding aspect, wherein the VCS loop is further configured to compress the VCS fluid from a first pressure at an outlet of the second evaporator to a second pressure at an outlet of the first evaporator and to further compress the VCS fluid from the second pressure at the outlet of the first evaporator to a third pressure at an inlet of the VCS condenser.

A twelfth aspect relates to the thermal management system of aspects 1 to 10, wherein the VCS loop further comprises a first VCS loop and a second VCS loop in a cascaded arrangement; wherein the first VCS loop comprises the VCS fluid disposed in the first VCS loop and a VCS fluid flow path comprising, in a direction of VCS fluid flow, the second evaporator, a first VCS compressor, and a first VCS condenser, the first VCS loop configured to transfer heat from the TES medium to the second VCS loop by the first VCS condenser; and wherein the second VCS loop comprises a second VCS fluid disposed in the second VCS loop and a second VCS fluid flow path comprising, in a direction of second VCS fluid flow, the first evaporator, the first VCS condenser, the second VCS compressor, and the VCS condenser, the second VCS loop configured to transfer heat to the ambient environment by the VCS condenser.

A thirteenth aspect relates to the thermal management system of any preceding aspect, the thermal management system further comprising a processor; wherein the processor is configured to cause: the heat exchanger to transfer heat from the primary thermal load to the TES medium; the main TES loop to transfer heat from the secondary thermal load to the TES medium; the first evaporator and the second evaporator to transfer heat from the TES medium to the VCS loop; the VCS condenser to transfer heat from the VCS loop to the ambient environment; and the main TES loop to accumulate the TES medium in the second tank to a predetermined volume set point at a temperature at least a predetermined temperature difference lower than the temperature of the TES medium in the first tank during operation of the thermal management system.

A fourteenth aspect relates to the thermal management system of aspect 13, wherein the processor is further configured to cause, after the TES medium is accumulated in the second tank to the predetermined volume set point: compression of the VCS fluid to cease until a temperature difference between the temperature of the TES medium in the first tank and in the second tank is less than the predetermined temperature difference and/or until the primary thermal load increases.

A fifteenth aspect relates to a method of transferring heat from a primary thermal load and a secondary thermal load to an ambient environment, comprising: transferring heat from the primary thermal load to a heat exchanger; transferring heat from the heat exchanger to a TES medium disposed in a main TES loop comprising the a heat exchanger pump, heat exchanger, a first tank, a first evaporator, a second evaporator, and a second tank; transferring heat from the secondary thermal load in the main TES loop to the TES medium; transferring heat from the TES medium to a VCS fluid disposed in a VCS loop via the first evaporator and the second evaporator; transferring heat from the VCS loop to the ambient environment via a VCS condenser in the VCS loop; and accumulating the TES medium to a predetermined volume set point in the second tank at a temperature at least a predetermined temperature difference lower than the temperature of the TES medium in the first tank.

A sixteenth aspect relates to the method of aspect 15, further comprising, after the accumulating: turning off a VCS compressor until a temperature difference between the TES medium in the first tank and the TES medium in the second tank is less than the predetermined temperature difference and/or until the primary thermal load increases.

A seventeenth aspect relates to the method of aspects 15 and 16, further comprising: decreasing a flow rate through the heat exchanger pump when the primary thermal load decreases.

An eighteenth aspect relates to the method of aspects 15 and 16, further comprising: increasing flow of the TES medium from the second tank through a mix valve to a pump recirculation loop when the primary thermal load increases, the pump recirculation loop comprising the heat exchanger pump, the heat exchanger, the mix valve, and a conduit in fluid communication with the heat exchanger and the mix valve.

A nineteenth aspect relates to the method of aspects 15 to 18, further comprising: setting a first three-way valve to bypass, at least partially, the heat exchanger and the secondary thermal load when the temperature of the TES medium in the second tank increases to a predetermined temperature set point, the first three-way valve downstream of and in fluid communication with the first tank, upstream of and in fluid communication with the first evaporator, and in fluid communication with an outlet of the second tank.

A twentieth aspect relates to the method of aspects 15 to 19, further comprising: setting a second three-way valve to bypass, at least partially, the first evaporator when the TES medium entering the second three-way valve has a temperature at or lower than a second predetermined temperature set point, the second three-way valve downstream of and in fluid communication with the first tank, upstream of and in fluid communication with the first evaporator, and in fluid communication with an inlet to the second evaporator.

In addition to the features mentioned in each of the independent aspects enumerated above, some examples may show, alone or in combination, the optional features mentioned in the dependent aspects and/or as disclosed in the description above and shown in the figures.

What is claimed is:

1. A thermal management system, comprising:
a main thermal energy storage ("TES") loop, and a vapor compression system ("VCS") loop thermally coupled to an ambient environment;
wherein the main TES loop comprises a TES medium disposed in a TES medium flow path, the TES medium flow path comprising, in a direction of TES medium flow: a heat exchanger pump, a heat exchanger, a first tank, a first evaporator, a second evaporator, and a second tank, the heat exchanger configured to transfer heat from a primary thermal load to the TES medium;
wherein a secondary thermal load is disposed on the main TES loop;
wherein the first evaporator and the second evaporator are configured to transfer heat from the TES medium to the VCS loop;
wherein the VCS loop comprises the first evaporator, the second evaporator, a VCS condenser, and a VCS fluid disposed in the VCS loop, and the VCS loop is configured to transfer heat from the main TES loop to the ambient environment by the VCS condenser; and
wherein the main TES loop and the VCS loop are configured to maintain the TES medium in the second tank at a temperature at least a predetermined temperature difference lower than the temperature of the TES medium in the first tank during operation of the thermal management system.

2. The thermal management system of claim 1, further comprising a two-phase pump loop ("TPPL") configured to cool the primary thermal load, the TPPL comprising a primary fluid disposed in a primary fluid flow path, the primary fluid flow path comprising, in a direction of primary fluid flow: the heat exchanger thermally coupling the TPPL to the main TES loop, a TPPL accumulator, a TPPL liquid pump, and the primary thermal load.

3. The thermal management system of claim 1, further comprising a two-phase pump loop ("TPPL") configured to cool the primary thermal load, the TPPL comprising a primary fluid disposed in a primary fluid flow path, the primary fluid flow path comprising, in a direction of primary fluid flow: the heat exchanger thermally coupling the TPPL to the main TES loop, a TPPL accumulator, a TPPL liquid pump, and the primary thermal load;
wherein the primary fluid flow path further comprises a bypass conduit configured to bypass the heat exchanger and deliver primary fluid to an inlet of the TPPL accumulator, the bypass conduit in fluid communication with the TPPL downstream of the primary thermal load and upstream of the heat exchanger and in fluid communication with the TPPL downstream of the heat exchanger and upstream of the TPPL accumulator;
wherein a first flow control valve is disposed on the bypass conduit and configured to cause the primary fluid to at least partially bypass the heat exchanger; and
wherein a second flow control valve is disposed on the TPPL downstream of the heat exchanger and upstream of the bypass conduit, and the second flow control valve is configured to control flow of the primary fluid from the heat exchanger to the TPPL accumulator.

4. The thermal management system of claim 1, further comprising a two-phase pump loop ("TPPL") configured to cool the primary thermal load, the TPPL comprising a primary fluid disposed in a primary fluid flow path, the primary fluid flow path comprising:
in a direction of primary fluid flow, a liquid-vapor separator, the heat exchanger thermally coupling the TPPL to the main TES loop, a TPPL accumulator, a TPPL liquid pump, and the primary thermal load;
a recirculation loop comprising the liquid-vapor separator and a recirculation pump configured to return the primary fluid from the liquid-vapor separator to the primary thermal load;
a TPPL liquid pump loop comprising the TPPL accumulator, the TPPL liquid pump, and a return conduit configured to recycle the primary fluid to the TPPL accumulator; and
a third flow control valve disposed downstream of the TPPL liquid pump loop and upstream of the recirculation loop and configured to maintain a flow rate of the primary fluid to the primary thermal load;
wherein the liquid-vapor separator comprises a vapor outlet in fluid communication with the heat exchanger, and a liquid outlet in fluid communication with the recirculation pump; and wherein the liquid-vapor separator is configured to separate the primary fluid into a liquid-phase primary fluid and a vapor-phase primary fluid.

5. The thermal management system of claim 1, further comprising a two-phase pump loop ("TPPL") configured to cool the primary thermal load, the TPPL comprising a primary fluid disposed in a primary fluid flow path, the primary fluid flow path comprising, in a direction of primary fluid flow: the heat exchanger thermally coupling the TPPL to the main TES loop, a TPPL accumulator, a TPPL liquid pump, a preheater heat exchanger configured to transfer heat to the primary fluid, and the primary thermal load.

6. The thermal management system of claim 1, further comprising:
a two-phase pump loop ("TPPL") configured to cool the primary thermal load, the TPPL comprising a primary fluid disposed in a primary fluid flow path, the primary fluid flow path comprising, in a direction of primary fluid flow: the heat exchanger thermally coupling the TPPL to the main TES loop, a TPPL accumulator, a TPPL liquid pump, a preheater heat exchanger thermally coupling the TPPL to a preheater TES loop, and the primary thermal load; and
the preheater TES loop comprising a preheater fluid disposed in a preheater fluid flow path, the preheater fluid flow path comprising, in a direction of preheater fluid flow: the preheater heat exchanger, a preheater tank, and a preheater pump; and
wherein the preheater TES loop is configured to control an amount of heat transferred to the primary fluid by the preheater heat exchanger.

7. The thermal management system of claim 1,
wherein the main TES loop further comprises a pump recirculation loop, the pump recirculation loop comprising a heat exchanger pump, the heat exchanger, and a first mix valve;
wherein the first mix valve is upstream of and in fluid communication with the heat exchanger pump, in fluid communication with the heat exchanger by a conduit junction downstream of the heat exchanger and a conduit-junction-mix-valve conduit, and downstream of and in fluid communication with the second tank; and
wherein the first mix valve is configured to increase the flow of TES medium from the second tank as the primary thermal load increases.

8. The thermal management system of claim 1,
wherein the main TES loop further comprises a pump recirculation loop, the pump recirculation loop comprising a heat exchanger pump, the heat exchanger, and a first mix valve;
wherein the first mix valve is in fluid communication with and upstream of the heat exchanger pump, in fluid communication with the heat exchanger by a conduit junction downstream of the heat exchanger and a conduit-junction-mix-valve conduit, and in fluid communication with and downstream of the second tank; and
wherein a flow rate through the heat exchanger pump is configured to decrease as the primary thermal load decreases.

9. The thermal management system of claim 1, wherein the main TES loop further comprises a first three-way valve in fluid communication with and downstream of the first tank, in fluid communication with and upstream of the first evaporator, and in fluid communication with an outlet of the second tank; and wherein the first three-way valve is configured to at least partially bypass the TPPL condenser and the secondary thermal load when the temperature of the TES medium in the second tank increases to a predetermined temperature set point.

10. The thermal management system of claim 1, wherein the main TES loop further comprises a second three-way valve in fluid communication with and downstream of the first tank, in fluid communication with and upstream of the first evaporator, and in fluid communication with an inlet of the second evaporator; and
wherein the second three-way valve is configured to at least partially bypass the first evaporator when the TES medium entering the second three-way valve has a temperature at or lower than a second predetermined temperature set point.

11. The thermal management system of claim 1, wherein the VCS loop is further configured to compress the VCS fluid from a first pressure at an outlet of the second evaporator to a second pressure at an outlet of the first evaporator and to further compress the VCS fluid from the second pressure at the outlet of the first evaporator to a third pressure at an inlet of the VCS condenser.

12. The thermal management system of claim 1, wherein the VCS loop further comprises a first VCS loop and a second VCS loop in a cascaded arrangement;
wherein the first VCS loop comprises the VCS fluid disposed in the first VCS loop and a VCS fluid flow path comprising, in a direction of VCS fluid flow, the second evaporator, a first VCS compressor, and a first VCS condenser, the first VCS loop configured to transfer heat from the TES medium to the second VCS loop by the first VCS condenser; and
wherein the second VCS loop comprises a second VCS fluid disposed in the second VCS loop and a second VCS fluid flow path comprising, in a direction of second VCS fluid flow, the first evaporator, the first VCS condenser, the second VCS compressor, and the VCS condenser, the second VCS loop configured to transfer heat to the ambient environment by the VCS condenser.

13. A method of transferring heat from a primary thermal load and a secondary thermal load to an ambient environment, comprising:
transferring heat from the primary thermal load to a heat exchanger;
transferring heat from the heat exchanger to a thermal energy storage ("TES") medium disposed in a main TES loop comprising a heat exchanger pump, the heat exchanger, a first tank, a first evaporator, a second evaporator, and a second tank;
transferring heat from the secondary thermal load in the main TES loop to the TES medium;
transferring heat from the TES medium to a vapor compression system ("VCS") fluid disposed in a VCS loop via the first evaporator and the second evaporator;
transferring heat from the VCS loop to the ambient environment via a VCS condenser in the VCS loop; and
accumulating the TES medium to a predetermined volume set point in the second tank at a temperature at least a predetermined temperature difference lower than the temperature of the TES medium in the first tank.

14. The method of claim 13, further comprising, after the accumulating:
turning off a VCS compressor until a temperature difference between the TES medium in the first tank and the TES medium in the second tank is less than the predetermined temperature difference and/or until the primary thermal load increases.

15. The method of claim 13, further comprising:
decreasing a flow rate through the heat exchanger pump when the primary thermal load decreases.

16. The method of claim 13, further comprising:
increasing flow of the TES medium from the second tank through a mix valve to a pump recirculation loop when the primary thermal load increases, the pump recirculation loop comprising the heat exchanger pump, the heat exchanger, the mix valve, and a conduit in fluid communication with the heat exchanger and the mix valve.

17. The method of claim 13, further comprising:
setting a first three-way valve to bypass, at least partially, the heat exchanger and the secondary thermal load when the temperature of the TES medium in the second tank increases to a predetermined temperature set point, the first three-way valve downstream of and in fluid communication with the first tank, upstream of and in fluid communication with the first evaporator, and in fluid communication with an outlet of the second tank.

18. The method of claim 13, further comprising:
setting a second three-way valve to bypass, at least partially, the first evaporator when the TES medium entering the second three-way valve has a temperature at or lower than a second predetermined temperature set point, the second three-way valve downstream of and in fluid communication with the first tank, upstream of and in fluid communication with the first evaporator, and in fluid communication with an inlet to the second evaporator.

19. A thermal management system, comprising:
a main thermal energy storage ("TES") loop, and a vapor compression system ("VCS") loop thermally coupled to an ambient environment; and
a processor;
wherein the main TES loop comprises a TES medium disposed in a TES medium flow path, the TES medium flow path comprising, in a direction of TES medium flow: a heat exchanger pump, a heat exchanger, a first tank, a first evaporator, a second evaporator, and a second tank, the heat exchanger configured to transfer heat from a primary thermal load to the TES medium;
wherein a secondary thermal load is disposed on the main TES loop;
wherein the first evaporator and the second evaporator are configured to transfer heat from the TES medium to the VCS loop;
wherein the VCS loop comprises the first evaporator, the second evaporator, a VCS condenser, and a VCS fluid disposed in the VCS loop, and the VCS loop is configured to transfer heat from the main TES loop to the ambient environment by the VCS condenser; and
wherein the processor is configured to cause:
the heat exchanger to transfer heat from the primary thermal load to the TES medium;
the main TES loop to transfer heat from the secondary thermal load to the TES medium;
the first evaporator and the second evaporator to transfer heat from the TES medium to the VCS loop;
the VCS condenser to transfer heat from the VCS loop to the ambient environment; and
the main TES loop to accumulate the TES medium in the second tank to a predetermined volume set point at a temperature at least a predetermined temperature difference lower than the temperature of the TES medium in the first tank during operation of the thermal management system.

20. The thermal management system of claim 19, wherein the processor is further configured to cause, after the TES medium is accumulated in the second tank to the predetermined volume set point:
compression of the VCS fluid to cease until a temperature difference between the temperature of the TES medium in the first tank and in the second tank is less than the predetermined temperature difference and/or until the primary thermal load increases.

* * * * *